US009542770B1

(12) United States Patent
Lininger

(10) Patent No.: US 9,542,770 B1
(45) Date of Patent: *Jan. 10, 2017

(54) AUTOMATIC METHOD FOR PHOTO TEXTURING GEOLOCATED 3D MODELS FROM GEOLOCATED IMAGERY

(71) Applicant: Google Inc., Mountain View, CA (US)

(72) Inventor: Scott Lininger, Lafayette, CO (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,239

(22) Filed: Jul. 20, 2015

Related U.S. Application Data

(63) Continuation of application No. 14/543,415, filed on Nov. 17, 2014, now Pat. No. 9,092,899, which is a continuation of application No. 13/209,120, filed on Aug. 12, 2011, now Pat. No. 8,890,863.

(51) Int. Cl.
| | | |
|---|---|---|
| *G06T 15/04* | (2011.01) | |
| *G06T 19/20* | (2011.01) | |
| *G06T 17/05* | (2011.01) | |
| *G06T 15/20* | (2011.01) | |
| *G06T 7/00* | (2006.01) | |
| *G06T 7/40* | (2006.01) | |

(52) U.S. Cl.
CPC ............. *G06T 15/04* (2013.01); *G06T 7/0046* (2013.01); *G06T 7/407* (2013.01); *G06T 15/20* (2013.01); *G06T 17/05* (2013.01); *G06T 19/20* (2013.01); *G06T 2215/16* (2013.01)

(58) Field of Classification Search
CPC ........... G06T 13/00–13/80; G06T 3/00–3/608; G06T 11/00–11/80; G06T 15/00–15/87; G06T 17/00–17/30; G06T 19/00–19/20
See application file for complete search history.

(56) References Cited

U.S. PATENT DOCUMENTS

| | | |
|---|---|---|
| 5,303,337 A | 4/1994 | Ishida |
| 6,912,293 B1 | 6/2005 | Korobkin |
| 7,561,164 B2 | 7/2009 | Baumberg |

(Continued)

OTHER PUBLICATIONS

Haines, Eric, and Tomas Akenine-Moller. "Real-time rendering." 2nd ed. (2002), pp. 118-120.*

(Continued)

*Primary Examiner* — Daniel Hajnik
(74) *Attorney, Agent, or Firm* — Dority & Manning, P.A.

(57) ABSTRACT

A method and system for applying photo texture to geolocated 3D models operates within a 3D modeling system. The modeling system includes a modeling application operating on a workstation and a database of geotagged imagery. A 3D model created or edited within the 3D modeling system is geolocated such that every point in the 3D modeling space corresponds to a real world location. For a selected surface, the method and system search the database of imagery to identify in the database one or more images depicting the selected surface of the 3D model. The method and system identify the boundaries of the selected surface within the image by transforming two or more sets of coordinates from the 3D modeling space to a coordinate space corresponding to the image. The portion of the image corresponding to the selected surface is copied and mapped to the selected surface of the 3D model.

19 Claims, 22 Drawing Sheets

(56) References Cited

U.S. PATENT DOCUMENTS

| | | |
|---|---|---|
| 2004/0051711 A1 | 3/2004 | Dimsdale et al. |
| 2005/0162419 A1 | 7/2005 | Kim et al. |
| 2006/0043264 A1 | 3/2006 | Sakurai |
| 2008/0052372 A1 | 2/2008 | Weber et al. |
| 2009/0259976 A1* | 10/2009 | Varadhan ................ G06T 15/20 715/850 |

OTHER PUBLICATIONS

Chopra, "Google SketchUp 7 for Dummies", Wiley Publishing, Inc., Chapter 8 (2009).
Chopra, "Google SketchUp 8 for Dummies", Wiley Publishing, Inc., Chapter 8 (2011).
Fruh et al., "Constructing 3D City Models by Merging Aerial and Ground Views", Computer Graphics and Applications, IEEE 23.6 (2003), pp. 52-61.
Grzeszczuk et al., "Creating Compact Architectural Models by Geo-Registering Image Collections", Computer Vision Workshops (ICCV Workshops), 2009 IEEE $12^{th}$ International Conference on, Sep. 27, 2009-Oct. 4, 2009, pp. 1718-1725.
Sinha et al., "Interactive 3D Architectural Modeling from Unordered Photo Collections", ACM Transactions on Graphics, vol. 27, Issue 5, Dec. 2008, Article No. 159, 10 pages.
Snavely et al., "Modeling the World from Internet Photo Collections", International Journal of Computer vision 80.2 (2008), pp. 189-210.
Snavely et al., "Photo Tourism: Exploring Photo Collections in 3D", ACM Transactions on Graphics, vol. 25, Issue 3, Jul. 2006, pp. 835-846.

* cited by examiner

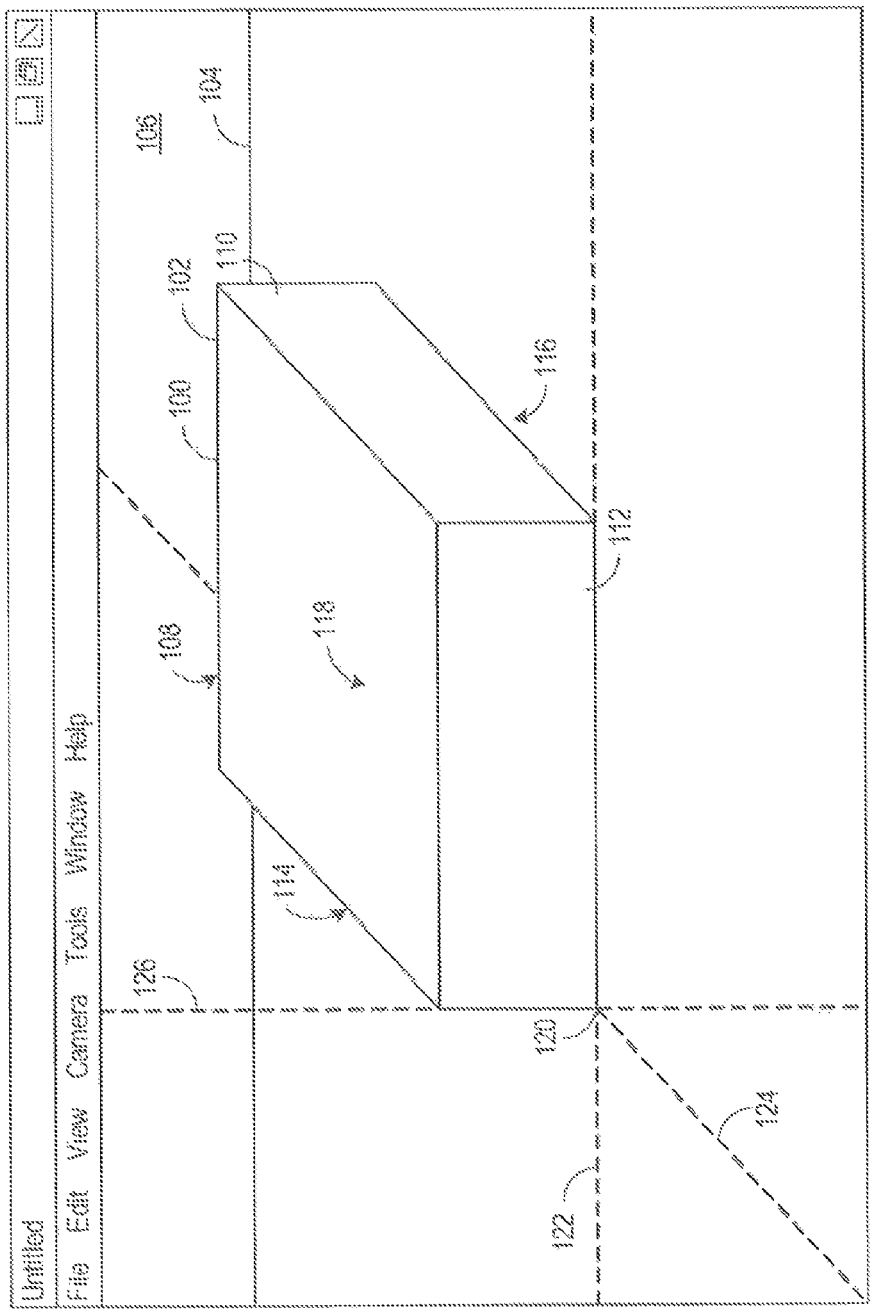

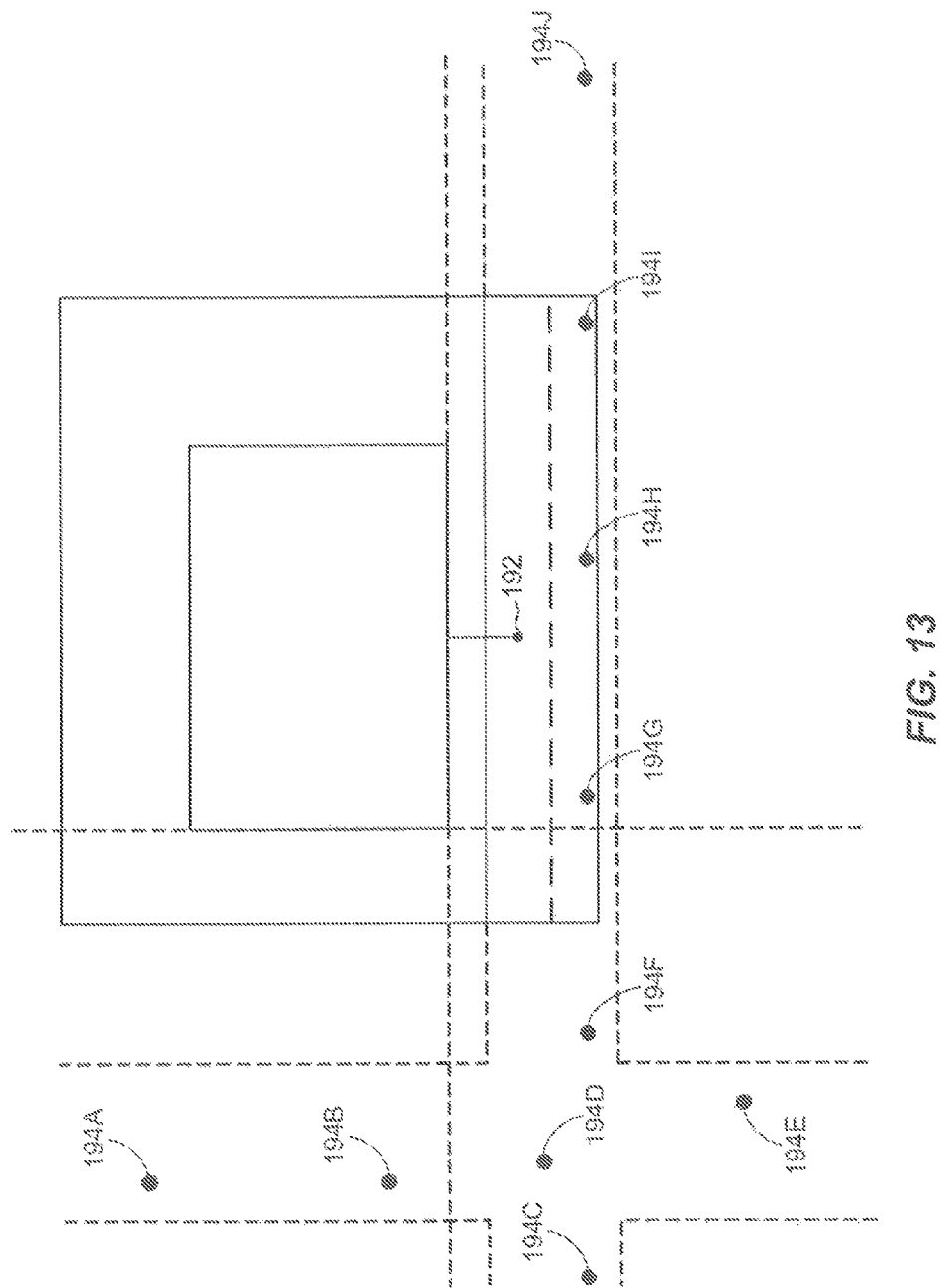

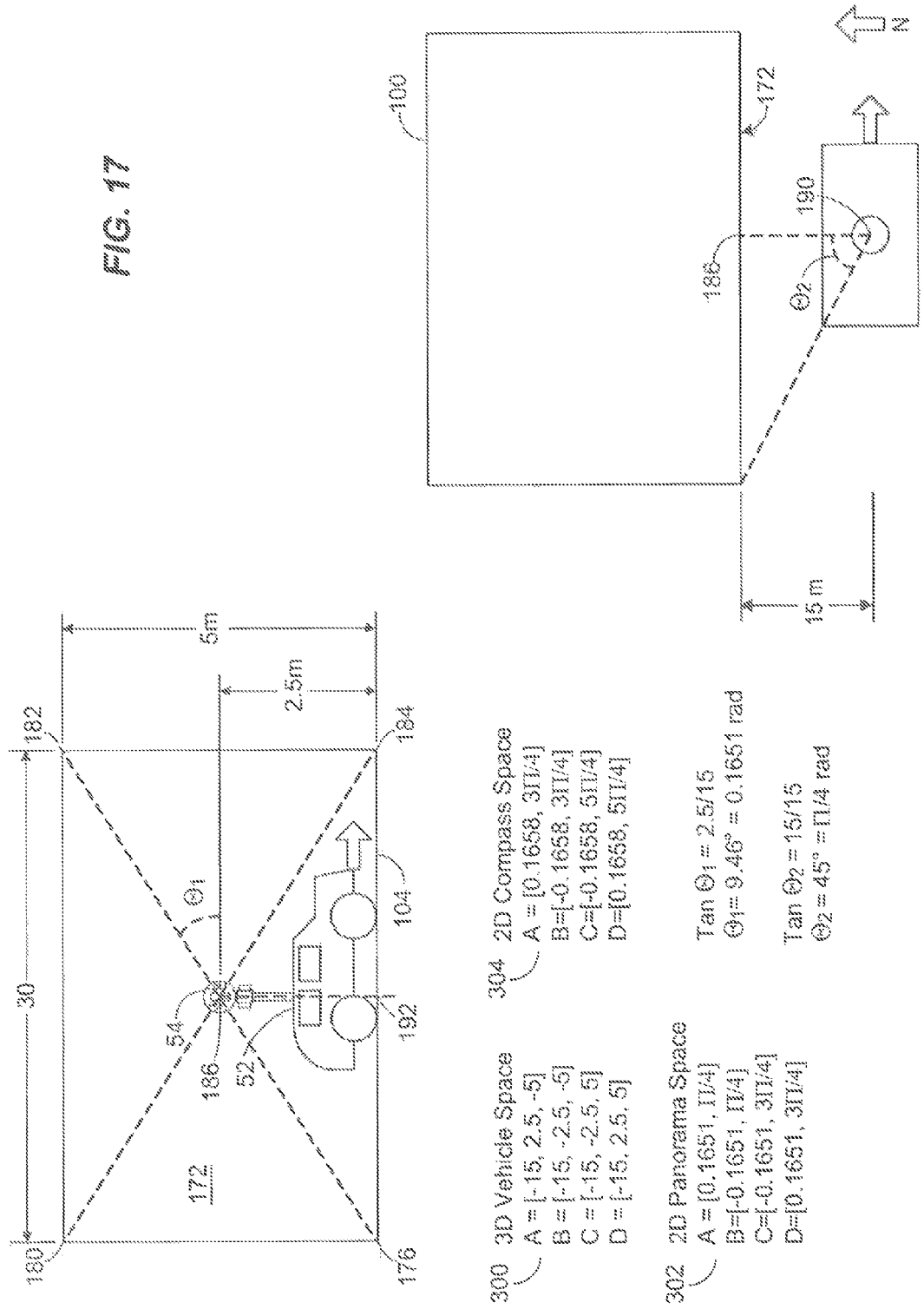

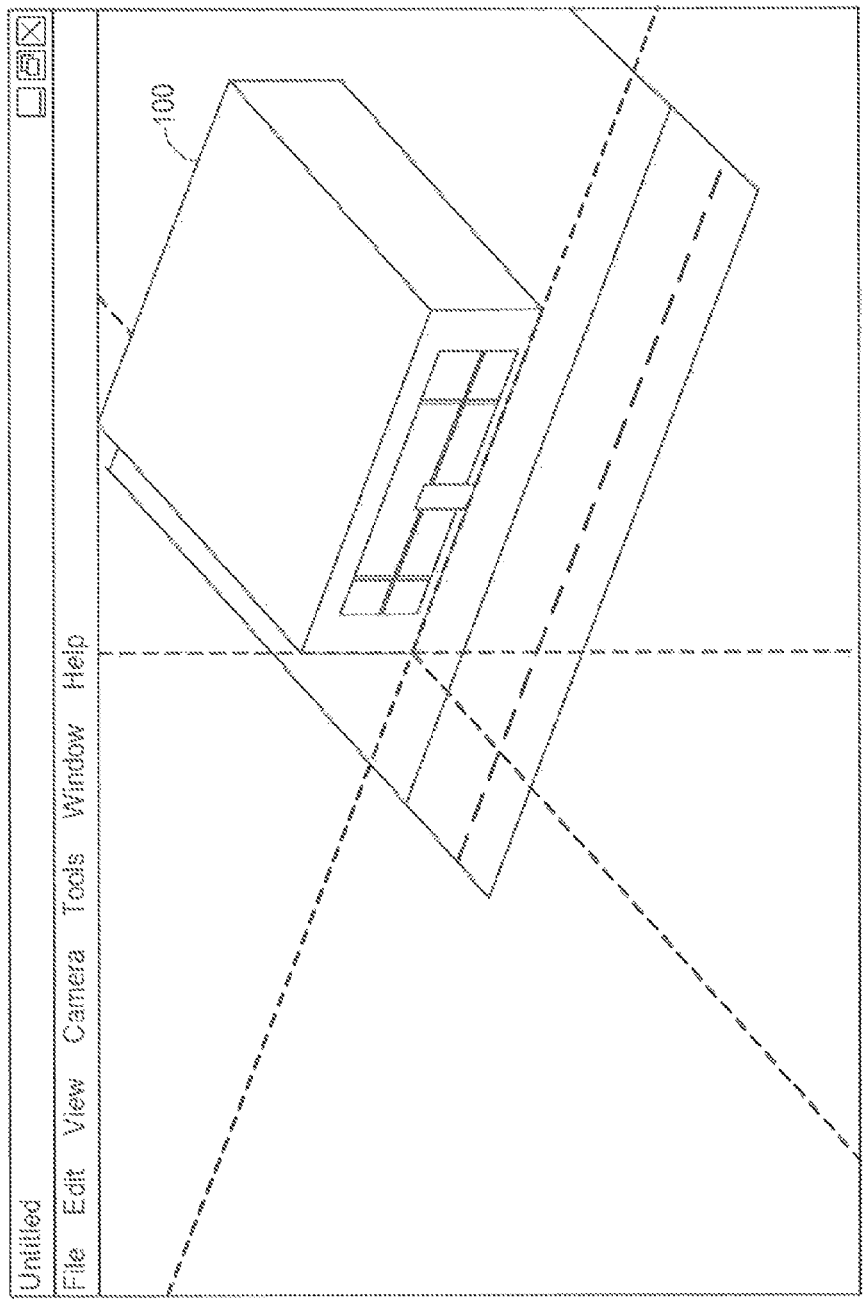

US 9,542,770 B1

AUTOMATIC METHOD FOR PHOTO TEXTURING GEOLOCATED 3D MODELS FROM GEOLOCATED IMAGERY

PRIORITY CLAIM

This application is a continuation of U.S. patent application Ser. No. 14/543,415 having a filing date of Nov. 17, 2014 which is a continuation of U.S. patent application Ser. No. 13/209,120 having a filing date of Aug. 12, 2011 (now U.S. Pat. No. 8,890,863 issued Nov. 18, 2014). Applicants claim priority to and benefit of all such applications and incorporate all such applications herein by reference.

FIELD OF TECHNOLOGY

The present disclosure relates to photo texturing of geolocated three-dimensional models and, more specifically, to a system and a method configured to automatically identify and capture from a geolocated photograph a view of a selected surface and to apply the captured view of the selected surface to photo texture a corresponding face of a three-dimensional geolocated model.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Advances in computer-aided three-dimensional (3D) modeling—both in terms of the number of available software applications and the ease with which the available applications can be used—have facilitated the proliferation of 3D digital modeling through a number of technological areas. Using computer-aided drafting (CAD) programs, digital modeling software, and the like, professionals and novices alike can generate digital, 3D models of buildings, spaces, objects, etc.

One context in which computer-aided 3D modeling has found particular utility is the field of digital cartography. One function of digital cartography is to generate maps that provide accurate visual depictions of an area. In particular, some maps now allow a user to visualize a particular location as it actually appears, by integrating photographic elements from satellite imagery, aerial imagery, and surface imagery with traditional cartographic elements (e.g., information about road locations, geographic features, etc.) and advanced location data (e.g., from the Global Positioning System (GPS)). In some instances, digital maps may allow a user to view an element such as, for example, a building, as a 3D model.

Generally, 3D models depicted in digital maps are created using computer-aided 3D modeling programs. In some instances, the 3D models are untextured. That is, the 3D models depict the shape of the building, but do not accurately depict the building's visual characteristics, such as the building's facade. In other instances, the 3D models are textured using, for example, one or more photographic images of the real-world object modeled. The process of applying a photographic image to a model of a real-world object is referred to as "photo texturing."

The tedious and time-consuming nature of the photo texturing process limits the capacity of most digital map systems to implement accurate 3D modeling of mapped areas. To model and texture a given object, images of the object must be acquired, usually from several angles. In some instances, this may require traveling to the object. However, even when such images are readily available, applying the images to the surfaces of a 3D model is often a non-trivial task requiring at least selection of a portion of an image and alignment of the image characteristics (e.g., the angle from which the image was taken with respect to the surface to be photo textured) with the model.

SUMMARY

In an embodiment, a computer-implemented method for applying photo texturing to a 3D model of a real-world object includes receiving geolocation information for a point in a model space in which the 3D model is located. Thereafter, the method receives a selection of a surface of the 3D model and receives a request to automatically apply to the selected surface a photo texture. The method proceeds to select an image to use to photo texture the selected surface and to select an area of the image to apply to the selected surface. Having selected the area, the method applies the area of the selected image to the selected surface.

If desired, the computer-implemented method may select an image to use to phototexture the selected surface by selecting a first image of a plurality of geolocated images, which, in turn, may include selecting a point of view of a panoramic image. Selecting a first image may also include determining a real-world location from which a real-world surface corresponding to the selected surface could be viewed, determining one or more geolocated images captured at the determined real-world location, and selecting as the first image one or more geolocated images captured at the determined real-world location. Further, selecting as the first image one of the one or more geolocated images captured at the determined real-world location may include selecting an image that depicts the real world surface, which may, in turn, include selecting a point of view of a panoramic image captured at the determined real-world location.

In another embodiment, a system includes a network; a database communicatively coupled to the network, a display device; a processor communicatively coupled to the database via the network and to the display device; and a memory device storing a set of machine readable instructions executable by the processor. The database stores a plurality of images, each image having associated with it a set of information specifying at least the location at which the image was captured. The instructions stored on the memory device are operable to cause the processor to display on the display device a modeling space for modeling a 3-dimensional object. The instructions cause the processor to receive a command to geolocate a point in the modeling space. Thereafter, the instructions cause the processor to create a 3-dimensional model of the 3-dimensional object, to receive a selection of a surface of the 3D model, and to receive a request to photo texture the selected surface. In response to receiving the request, the instructions cause the processor to select from the database an image to use to photo texture the selected surface, select an area of the image to apply to the selected surface; and apply the area of the selected image to the selected surface.

In yet another embodiment, a computer system for applying photo texturing to a 3D model of an object includes a display device, a processor coupled to the display device, and a memory device storing a set of machine readable instructions executable by the processor. The instructions cause the processor to display on the display device a modeling space for modeling a 3-dimensional object. Thereafter, the instructions cause the processor to geolocate a point in the modeling space and to create a 3-dimensional model of the 3-dimensional object. The processor, in accordance with the instructions, causes the processor to receive a selection of a surface of the 3D model and to receive a request to photo texture the selected surface. In response to the request to photo texture the selected surface, the instructions cause the processor to select from a database an image to use to photo texture the selected surface, select an area of the image to apply to the selected surface, and apply the area of the selected image to the selected surface.

BRIEF DESCRIPTION OF THE DRAWINGS

FIG. 2A depicts an application window displaying an exemplary 3D model.

FIG. 13 depicts an exemplary set of image capture locations relative to a likely viewing point determined in accordance with the method of FIG. 11.

FIG. 17 illustrates for an exemplary instance a transformation of four sets of coordinates through the coordinate systems of FIGS. 14A through 16.

FIG. 19 depicts a selected surface of a 3D model that is photo textured by an application operating in accordance with a presently described embodiment.

DETAILED DESCRIPTION

Figure 1A:
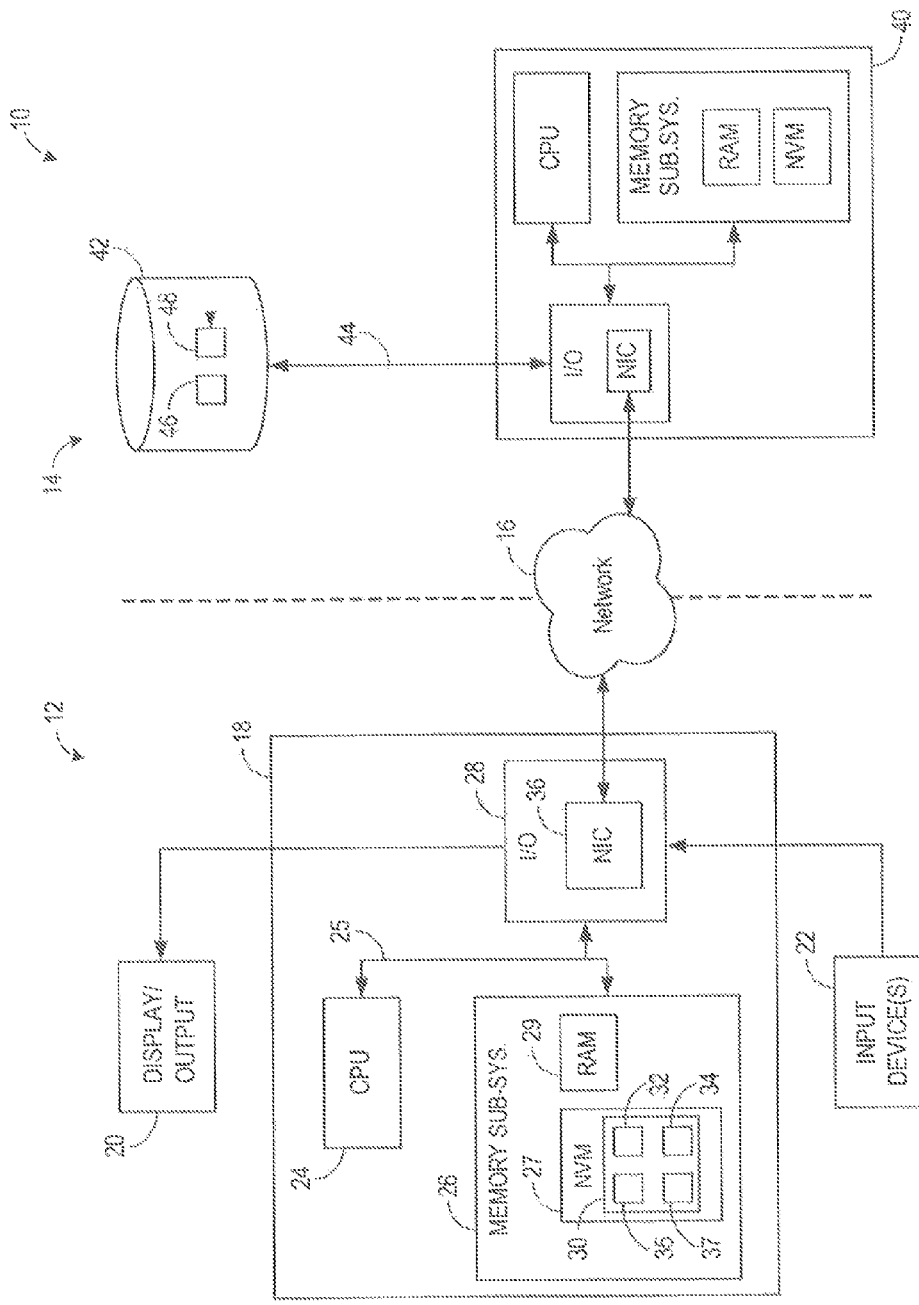
FIG. 1A is a block diagram of an exemplary system for photo texturing a 3D model in accordance with a presently described embodiment.

A computer-implemented method or a computer system or a computer-readable medium storing a set of instructions for execution on a processor operates to apply a photo texture to one or more surfaces of a 3D model of a real-world object. The method or apparatus receives geolocation information a point in a model space in which the 3D model is located. Upon receipt of a selection of a surface of the 3D model, and a request to automatically apply to the selected surface a photo texture, the method or apparatus identifies an image to use to photo texture the selected surface, identifies an area of the image to apply to the selected surface, and photo textures the selected surface by applying the identified area of the image to the selected surface.

In various embodiments, the method and apparatus may identify an image to use to photo texture the selected surface of the 3D model by identifying one or more sets of coordinates corresponding to a real-world location of selected surface and, thereafter, identifying a stored image of the real world location specified by the sets of coordinates. The method and apparatus may transform the one or more sets of coordinates through a plurality of coordinate spaces to identify the portion of the image to apply to the selected surface.

Generally speaking, a 3D modeling system allows a user to design 3D models, for example, for architectural, civil and mechanical design purposes, or for digital modeling and/or rendering of any 3D object. For example, a 3D modeling system may allow an architect to render a new building design in 3D such that the building can be displayed from any angle. An interior designer may design a space and display the space to a client as it would appear as the client entered the space from one or more directions, in various lighting conditions, or with various design options. An engineer may design a consumer device, such as a mobile phone, viewing it from all angles to gauge its aesthetic appeal.

Generally, the realism of such models is limited by the amount of time and effort available to provide detail to each of the modeled surfaces. For example, an architect may spend countless hours programming the surfaces of a 3D model to have just the right surface texturing (e.g., a brick facade), to include doors and windows, to reflect light in just the right manner, etc. Sometimes, however, it is desirable to model an existing building (as opposed to a building being designed) in a fast and efficient manner. This may be the case where, for instance, an architect is modeling the site of a new building, e.g., including the existing buildings around the structure being designed. In these instances, it is significantly more efficient to apply to the models images of the existing buildings as they exist. By doing so, it is possible to create 3D models with a high degree of realism in an expeditious manner. The process of adding surface texture (e.g., color, detail, etc.) to a digitally rendered 3D model is called "texture mapping." "Photo-texturing" is the process of texture mapping a digital image (such as a scanned photograph, a digital photograph, etc.) to a surface of a digitally rendered 3D model.

Of course, in order to apply a photo-texture to a surface of a 3D model, it is necessary first to have a photograph of the surface. Generally, where the object is a structure, this may require traveling to the location of the structure and acquiring photographic images (e.g., with a digital camera) of any surface of the structure that is to be photo-textured. For structures located in remote or otherwise inaccessible locations, acquiring the images may be prohibitively expensive or time consuming. Alternatively, one or more existing images may be used to photo-texture a surface or surfaces of the structure.

In any event, a user desiring to apply a photo texture to a surface of a 3D model, having determined an image to apply, may select a portion of the image that depicts a surface corresponding to the surface of the 3D model to which the photo texture will be applied. Selection of the area could be accomplished by drawing a polygonal (e.g., rectangular) shape over the digital image, locating crosshairs indicative of vertices of such a polygon, drawing a freehand selection area, sizing and/or locating a pre-determined polygon (e.g., corresponding to the shape of the surface to be photo-textured), etc. The selected portion of the image may then be mapped to the surface of the 3D model by UV mapping, as discussed below.

A database of digital photographic images may provide a ready source of existing images that could be used to photo-texture surfaces of structures modeled in 3D. The database may include images of structures within some area. For example, a database may include images of structures on one block, images of structures in a particular city, images of structures in a particular country, etc. For ease of locating in the database a particular structure, each of the images may be associated with information (i.e., the images may be "tagged") indicating the location from which the image was captured. The location indication may be in any appropriately searchable form including, by way of example and not limitation: latitude and longitude, intersection, street address, zip code, distance and direction from a known, fixed point, etc. The identification of a geographic location of a real-world object (e.g., a structure, a camera) is referred to herein as "geolocation." An object for which a geographic location has been identified is said to be "geolocated." The association (e.g., by metadata) of geolocation information with a file (e.g., a digital image) is referred to herein as "geotagging." A file (e.g., an image file) having associated metadata indicative of a geolocation (e.g., a geolocation of the camera at the time the image was captured) is said to be "geotagged."

The database of digital photographic images may be populated with geotagged images recorded by, for example, a digital camera with a GPS unit that allows the camera to geolocate. In some embodiments, the metadata associated with the image may include more information than just a simple location of the camera at the time an image was captured. For example, the metadata may include the direction the camera was facing when the image was captured, the focal point of the lens, the height and/or angle of the camera with respect to the ground, the zoom level of the lens, the distance from the camera to nearby objects, etc.

The images and metadata may be captured, for example, by a plurality of cameras mounted on a moving vehicle so as to provide (and capture) a 360-degree view as vehicle moves. Each time a set of images is captured—which may happen based on a time interval or a distance interval—the images are geotagged (e.g., using information from a GPS receiver) and stored. Additional information, such as information from a laser rangefinder or information about the vehicle speed and direction, may also be stored as associated with the images. An application specific interface (API) may allow various programs to access the data stored in the database.

FIG. 1 depicts a block diagram of an embodiment of a system 10 for photo-texturing a 3D model. The system 10 includes a user-side system 12 and a server side system 14 communicatively coupled to each other by network 16. The user side system 12 includes a user workstation 18. The user workstation 18 includes, or is communicatively coupled to, a display 20 and one or more input devices 22, such as a keyboard, a mouse, a trackpad and/or touchpad, a touch-sensitive screen, a gesture tracking system, or any other known input method. Of course, the input device 22 may be separate from the display 20 or may include the display 20 (e.g., where the input device 22 is a touch-sensitive display). The user workstation includes a processor 24, a memory 26, and an input/output (I/O) interface 28.

The I/O interface 28 couples the display 20 and the input devices 22 to a bus 25 in the workstation 18, which bus 25, in turn, communicatively couples the I/O interface 28 to a processor 24 and a memory sub-system 26. The processor 24 may be any processor capable of executing one or more programs stored in the memory sub-system 26 (as described below) to perform the specific tasks associated with the 3D photo-texturing application herein described and, in particular, may be a general purpose processor, a digital signal processor, a field programmable gate array (FPGA), an application specific IC (ASIC), etc. The processor 24 may operate to retrieve one or more applications 30 from the memory sub-system 26 and to execute the applications 30. An exemplary workstation 18 includes an operating system (OS) 32 such as Windows, Mac OS, Linux, Android, etc. The exemplary workstation 18 may also store in the memory sub-system 26 a software application 34 embodying the 3D modeling application. For simplicity, the term "software application" is used herein to refer both to an instance of a software application executing in the workstation 18 and to the set of computer instructions that defines the software application. However, it will be understood that while an instance of an application executes in the workstation 18, machine-readable instructions of the application are stored on a non-transitory, computer-readable medium such as a persistent memory 27, a system cache 29, or both. The persistent memory 27 may be a hard disk, a flash drive, a CD, a DVD, a tape drive, etc. In at least some of the embodiments, the persistent memory 27 is significantly slower that the system cache 29. In particular, the persistent memory 27 may have one or more of a slower read speed, a slower write speed, a lower bandwidth (i.e., the size of a data block the persistent memory 27 can supply to the CPU 24 at one time), etc.

The OS 32 executes on the processor 24 ("central processing unit" or "CPU") that includes one or several CPU cores, depending on the embodiment. The workstation 18 also includes the system cache 29 that may be implemented as a quickly-accessible, physical memory such as random access memory (RAM). In general, the system cache 29 may be provided on a same chip as the CPU 24 or on a separate chip. In some embodiments, the system cache 29 is a dedicated memory region on a RAM chip. During operation, the system cache 29 operates as an active storage, so that software tasks such as the application 30 access memory pages (or simply "pages") stored in the system cache 29 quickly and efficiently. While the application 30, including the OS 32 and the 3D modeling application 34, are generally described above as being stored on the persistent memory 27 and/or the system cache 29, the applications 30 may be stored on the server side system 14, on another workstation 18 on the user-side system 12, or some combination of the two.

With continued reference to FIG. 1, the workstation 18 and, in particular, the I/O interface 28, may include a network interface card 36 via which the workstation 18 may be coupled by the communication network 16, which may be the Internet, for example. Specifically, the workstation 18 may communicate via the network 16 with a server 40 on the server-side system 14, which may, in turn, be in communication, for example over a local area network (LAN) 44, with one or more databases 42.

The server 40 may be configured similarly to the workstation 18, in that it may include one or more displays, CPUs, memory sub-systems, I/O interfaces, input devices, etc. Moreover, while described herein as a single server, the server 40 may be any number of servers 40 according to the architecture of the network 16, the LAN 44, server loading and/or demand parameters, etc.

As described in greater detail below, the server 40 generally operates to receive from the workstation 18, via the network 16, one or more requests generated by the 3D modeling application 34 and, in response to the request, to retrieve information from the database 42 and transmit the retrieved information back to the workstation 18, again via the network 16. The server 40 may complete one or more processing steps before and/or after retrieving the information from the database 42, such as, by way of example and not limitation, calculating a value using as input the information from the database 42 or performing a lookup of a database index value. Additionally, in some embodiments, the server 40 may store one or more applications, including the 3D modeling application 34. In these instances, the workstation 18 may receive the application 34 from the server 40 and execute the application 34 locally on the workstation 18. In alternate embodiments, the application 34 may be stored and executed on the server 40, and the server 40 may provide only display and/or user-interface data via the network 16 to the workstation 18. That is, the workstation 18 may serve as a display and/or interface terminal for the application executed on the server 40.

In still other embodiments, the application 34 is stored in the memory sub-system 26 and executed by the CPU 24 on the workstation 18, and interacts with a second application (not shown) stored and executed on the server 40. The second application may be, by way of example and not limitation, an interactive map application that retrieves (e.g., from the database 42) and/or renders maps, satellite imagery, terrain data, etc. for display on an output device such as the display 20, provides an interactive user interface to allow a user to worn in on a desired location, pan to a desired location, select various types of data on the map or the satellite image, etc. In one such embodiment, the second application provides two-dimensional and three-dimensional representations of geographic regions. A user may view a two-dimensional satellite image of a certain location and dynamically switch to a three-dimensional view of the location. At the time when the second application transitions from a two-dimensional rendering to a three-dimensional rendering, the second application at least sometimes requests additional resources such as bitmap images, modeling data, etc. Further, in some cases, the second application invokes additional sets of functions, such as rendering functions for three-dimensional graphics, stored in a corresponding dynamically linked library (DLL), for example.

Figure 1B:
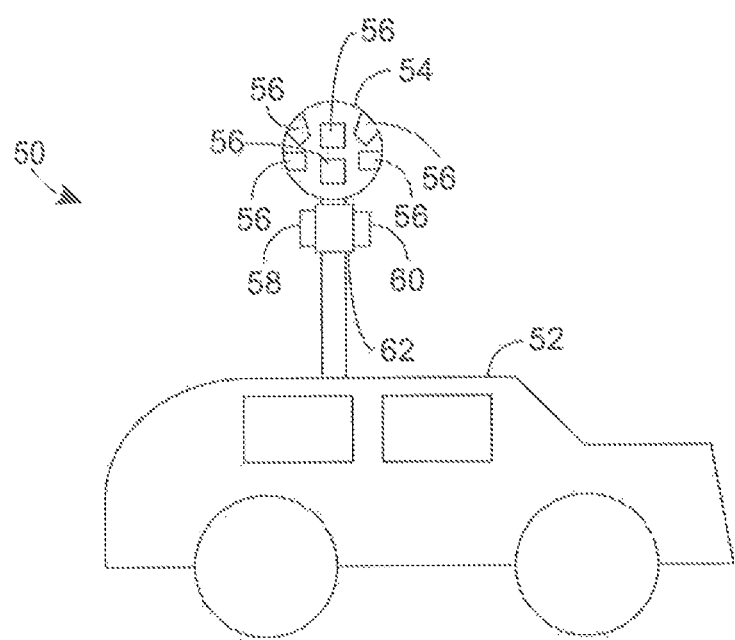
FIG. 1B illustrates an exemplary system for capturing images.

The information retrieved and/or used by the second application may be stored in the database 42. Specifically, the database 42 may include map data, satellite imagery, terrain data, imagery captured from a pedestrian and/or vehicular perspective (e.g., views of buildings taken from a street or a pedestrian walkway), panoramic imagery, etc., any and/or all of which may be have associated with it meta-data including: a location from which an image was captured; a type of camera and/or lens used to capture an image; an angle of a camera relative to the ground and/or relative to a velocity of the camera; a heading and or velocity of a camera and/or the camera's viewport when an image is captured; a zoom level of an image captured; and any other parameter desired. In some embodiments, the database 42 includes a data store 46 of map and satellite images and associated data and a data store 48 of images captured from street level and associated data. Of course, the data stores 46 and 48 may be on a single database 42, may be on separate databases 42, or may each or collectively be spread across multiple databases 42.

Where the database 42 and, in particular, the data store 46, includes panoramic imagery, each panoramic image may include or be constructed from a number of individual images captured and combined to create a panoramic image. The panoramic image may be captured by any of several means and, in particular, may be captured by a special image capture system 50 mounted on and/or in a vehicle 52, (e.g., a bicycle, an automobile, a motorcycle, a cart, a tricycle, a snowmobile, etc.), as depicted in FIG. 1B or, perhaps, carried in backpack. The image capture system 50 may include a sensor pod 54 having a number of cameras 56, each fixed with respect to the sensor pod 54 and collectively capturing a 360-degree view. In an embodiment of the image capture system 50, one or more Global Positioning System (GPS) units 58 operate to determine the location of the image capture system 50 as each panoramic image is captured, and data from the GPS units 58 is stored as metadata with the images in the data store 46. Additionally, one or more range scanners 60 (e.g., laser range scanners) may measure the distance from the sensor pod 54 to various objects captured in the panoramic images. Still further, a one or more antennas and receivers 62 may scan for wireless signals in the area, including mobile telephony signals, GPS signals, and/or wireless network signals (e.g., IEEE 802.11, IEEE 802.16, etc.). The image capture system 50 may also include various computer equipment (not shown), including one or more processors, memory subsystems, displays, input devices, etc., which may function to control the sensor pod 54, capture and store images and metadata, transmit the stored images and metadata to another device (e.g., the data store 46), etc.

With reference now to FIG. 2A, a person using the 3D modeling system to model a structure may create a 3D model of the structure. FIG. 2A depicts a 3D model 100 of a structure 102 set on a ground plane 104 in a 3D program space 106, as the 3D model 100 might be depicted on the display 20. The structure 100 includes generally planar sides 108, 110, 112, and 114 that are generally perpendicular to the ground plane 104 which is coincident with a bottom face 116 of the 3D model 100. A planar surface, generally parallel to the ground plane 104 (and to the bottom face 116), forms a top face 118 of the structure. It is worth noting the ground plane 104 need not necessarily correspond to the bottom face 116 of the 3D model 100, but could instead correspond to the top face 118 of the 3D model 100, one of the sides 108, 110, 112, and 114 of the 3D model 100 and, in fact, need not correspond to any side or face of the 3D model 100. However, throughout this specification the 3D model 100 is described as modeling an above-ground section of a real-world building and, thus, for ease, the ground plane 104 will be described as corresponding to the bottom face 116 of the 3D model 100.

Figure 2B:
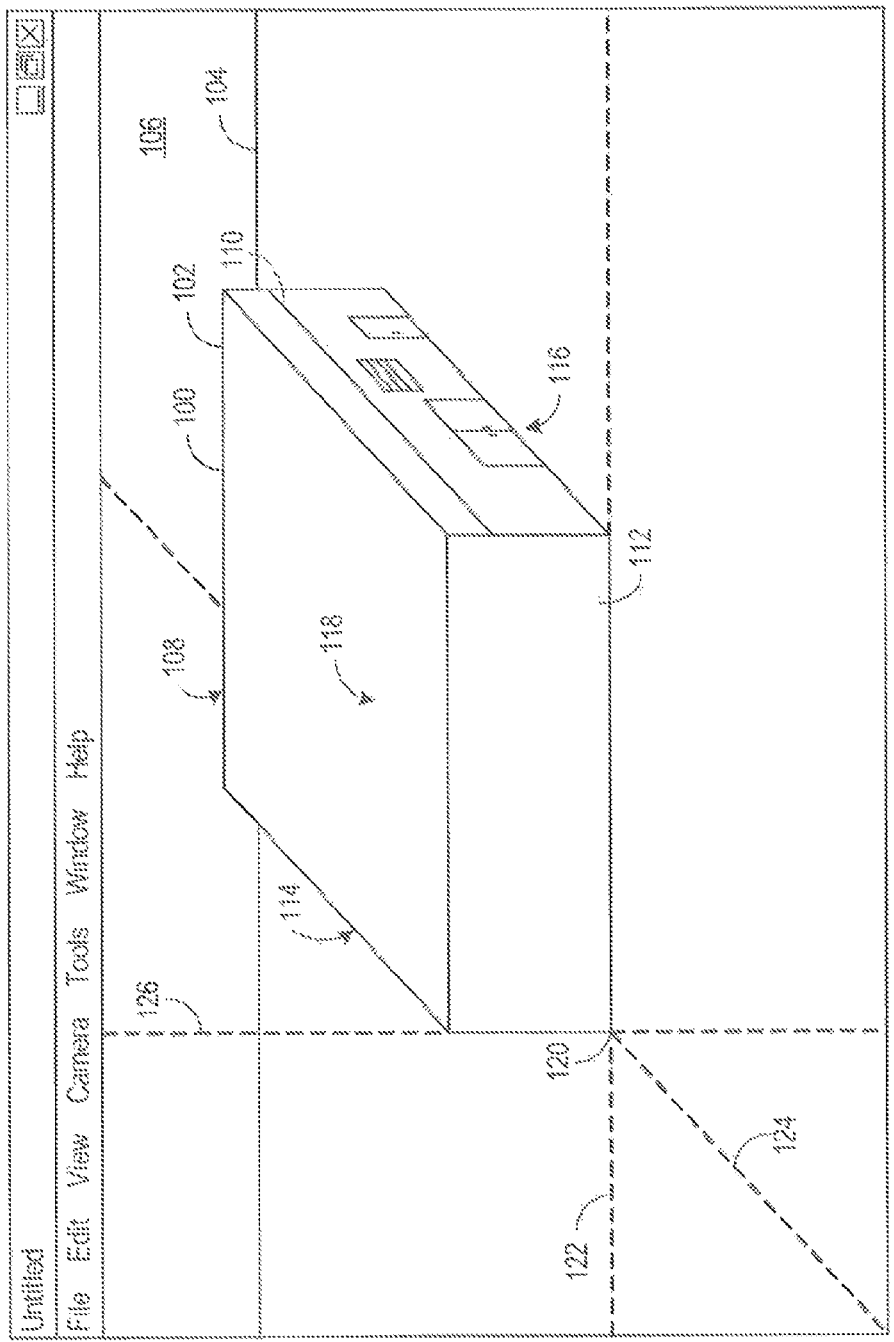
FIG. 2B depicts the application window of FIG. 2A displaying the 3D model with a photo textured face.

The system 10 may allow a user to select a surface of the 3D model 100 to texture. As used in this specification, the word "texture" refers to application to a surface of detail conveying texture. For example, a surface of a 3D model generally may be textured by applying to the selected surface a brick pattern, a concrete pattern, a glass facade pattern, a wood siding pattern, etc. The 3D modeling application 34 and, in particular, a photo texturing routine 35 described in this specification, textures a surface by applying to the selected surface of the modeled structure 102 an image of a corresponding surface of a real-world structure (not shown). Throughout this specification, this is referred to as photo-texturizing (or photo-texturing). For example, after photo-texturing, the side 110 of the 3D model 100 depicted in FIG. 2A may appear as depicted in FIG. 2B. Generally, photo texturing requires acquiring an image of the surface to which the photo texture is to be applied (and, possibly, manipulating an apparent viewing angle of the image to match that of the 3D model 100), and selecting the portion of the acquired image to apply to the selected surface. This is often a tedious, time-consuming process.

The database 42 may, in some instances, store geotagged imagery that may be used by a 3D modeling application 34 for photo texturing. For instance, the database 42 may store imagery with associated geotagging metadata that indicates the location at which each image was captured. The geotagging metadata may be stored and/or searchable by latitude and longitude, by address, by reference to a particular point or feature (e.g., "100 feet north of the intersection of Main Street and First Avenue"), or by any other desirable reference system. This may allow a user to search for a previously-captured image of the structure modeled by the 3D model 100, rather than requiring the user to acquire the image personally. The user may then select the portion of the image to apply to the selected surface as a texture, manipulate the perceived viewing angle of the image, and apply the selected portion of the image to the selected surface. This remains a tedious (if slightly less time-consuming) process.

If geotagged imagery of the 3D model 100 exists in the database 42, the photo texturing routine 35 may, in some instances, be able to apply the images as texture to the 3D model 100. To do this, the photo texturing routine 35 must have information about the location of the 3D model 100 in the 3D program space 106 of the modeling application 34. That is, the 3D model 100 must be geolocated within the modeling application 34. Once the 3D model 100 is geolocated such that the modeled structure's real-world location is known, the photo texturing routine 35 may access the database 42, determine whether appropriate imagery exists for the modeled structure, select an appropriate image or portion of an image to apply as texture to a selected surface of the 3D model 100, and apply the selected image or portion of an image to the selected surface. This process is described in greater detail below.

Referring again to FIG. 2A, the 3D program space 106 may be depicted on the display 20 as including having an origin 120 at the intersection of X, Y, and Z axes 122, 124, and 126, respectively. The 3D model 100 may be disposed within the 3D program space 106 such that an intersection of three planes (e.g., the sides 114 and 112 and the bottom face 116) is situated at the origin 120, as depicted in FIG. 2A. Of course, while it may be preferable to some users for the 3D-model 100 to have a surface (e.g., the bottom face 116) coincident with the plane defined by the X- and Y-axes 122 and 124, respectively, such alignment is not required.

The 3D program space 106 may be geolocated, before or after creating the 3D model 100, to establish the real-world location of the modeled structure. For example, a user may operate a user-interface of the modeling application 34 to cause the modeling application 34 to commence a geolocation routine 37 (see FIG. 1) (e.g., by using an input device to "click" a "button" in the user-interface, to select a "geolocate" or "add location" menu item, etc.). The geolocation routine 37 may cause the display 20 to display a dialog box, to display a new "window," to change to display a different screen, etc. The geolocation routine 37 may be part of or separate from the modeling application 34, may be executed locally on the workstation 18 or remotely on the server 40, and may use data stored on the workstation 18 or data stored in the server 40 or the database 42. In any event, the geolocation routine 37 allows the user to geolocate the 3D model 100 in the 3D program space 106 of the modeling application 34. Specifically, the geolocation routine 37 accesses a database (such as, for example, the database 42) of geotagged imagery and/or maps, and displays the imagery and/or maps on the display 20.

Figure 3:
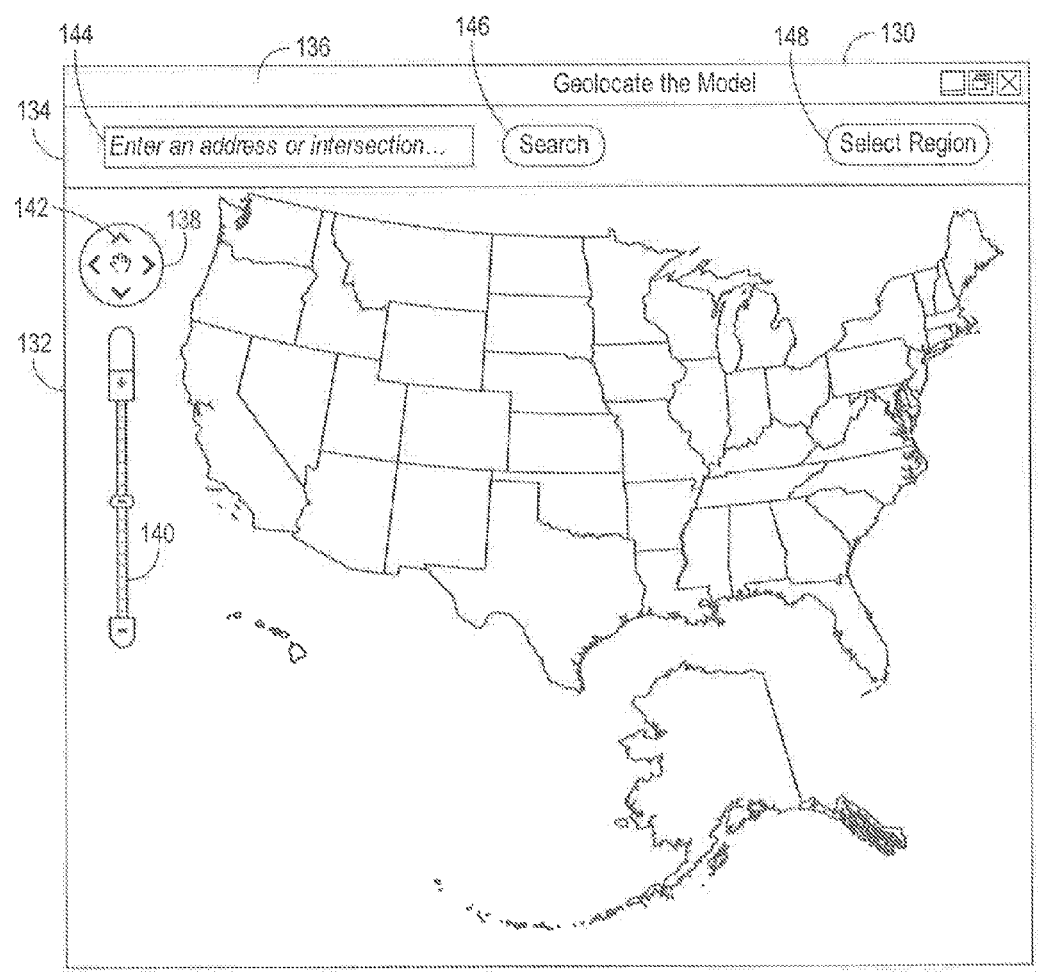
FIG. 3 depicts a first screen of a dialog box displayed during execution of a geolocation routine in accordance with a presently described embodiment.

FIG. 3 depicts one embodiment of a dialog box 130 that may be displayed on the display 20 in response to activation of the geolocation routine 37. The dialog box 130 may include a map or imagery display area 132, navigation bar 134, and a title bar 136. The map or imagery display area 132 may, for example, default to displaying an initial view, such as the view of North America, depicted in FIG. 3. Alternatively, the map or imagery display area 132 may default to any other view, such as a view of a continent, country, or city specified by a user, or to a view of the Earth. The default view displayed in the map or imagery display area 132 may be a graphical map, a satellite image, or some combination of a map and a satellite image. The map or image display area 132 may also include a pan control 138 and a zoom control 140. The pan control 138 allows the user to select one of four directional indictors 142 on the pan control 138. Each directional indicator 138 pans the map in the indicated direction. The zoom control 140 allows the user to zoom in and/or out on the location currently at the center of the display area 132. In some embodiments, a user may also manipulate the display area 132 with an input device by, for example, "dragging" the map with a mouse to pan, or "clicking" on the map to zoom in on a particular point.

For any particular image and/or map displayed in the display area 132, each pixel may be mapped to a set of coordinates to indicate the location of the pixel. The data for given pixels may be stored in the database 42 or may be calculated with reference to one or more reference points upon accessing the image and/or map. For instance, the image depicted in the display area 132 of FIG. 3 may have associated with it in the database 42 metadata indicating the coordinates of one or more reference points (e.g., a center point, a corner, multiple corners) (not shown), the resolution of the image (e.g., 800 pixels×350 pixels), the change per pixel in each coordinate value, etc. In this manner, the workstation 18 and/or the server 40 may provide to the geolocation routine 37 the geolocation of each pixel. The coordinates may be selected from any coordinate system desirable for a mapping the available area (e.g., the surface of the Earth) and, in at least some embodiments, the set of coordinates comprises a latitude and a longitude. As the image and/or map is zoomed in (i.e., as the resolution of the displayed area is increased, for example, by manipulating the zoom control 140), the accuracy and/or the precision of the set of coordinates associated with each pixel in the display area 132 may increase. At some minimum zoom level, the metadata for a particular image and/or map may include multiple sets of coordinates. For example, when the zoom control 140 is adjusted to "street level" (i.e., when individual streets are visible in the display area 132), each pixel may be associated with a first set of coordinates (e.g., a latitude and a longitude) and a second set of coordinates (e.g., a nearest street address).

Figure 4:
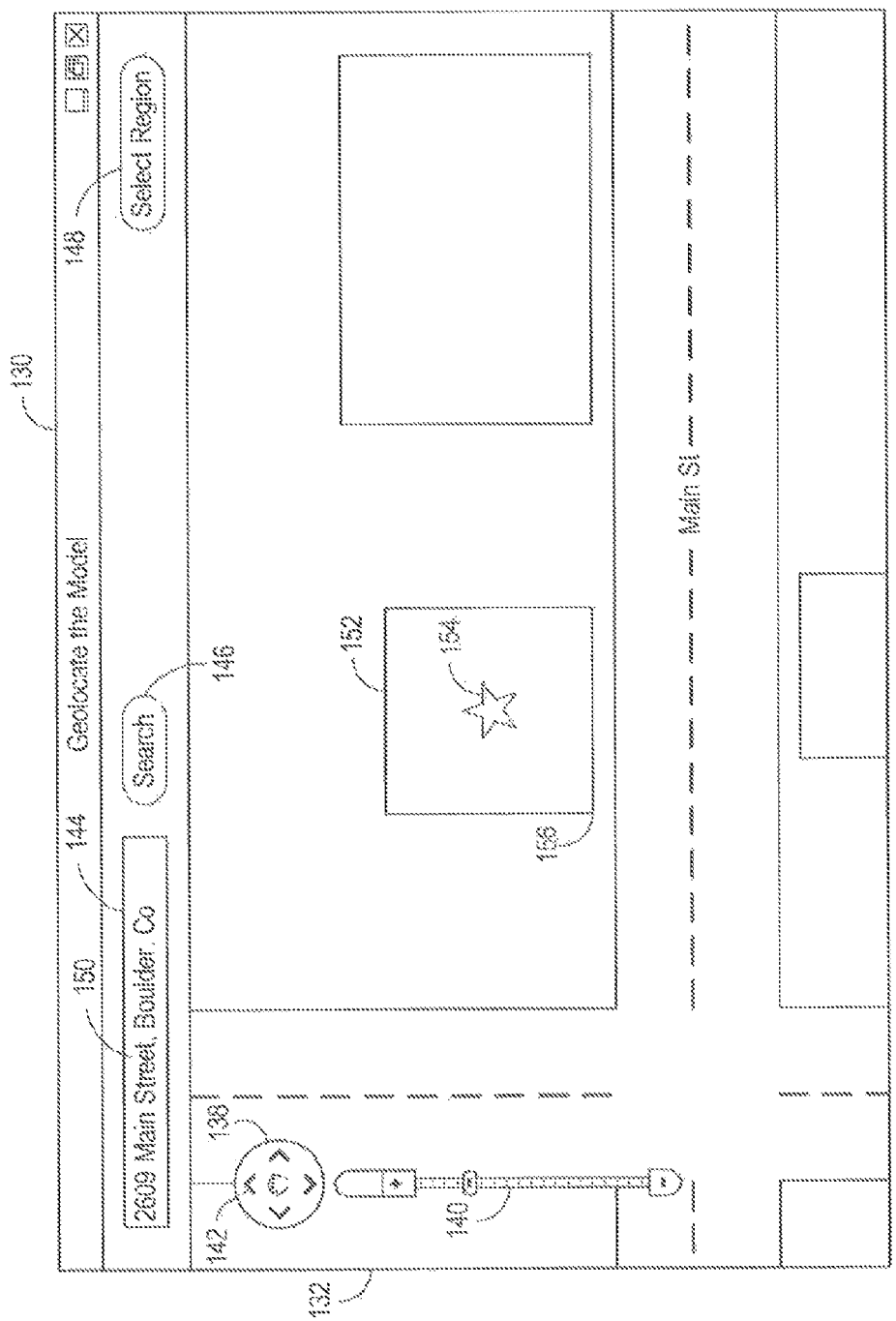
FIG. 4 depicts another screen of the dialog box of FIG. 3.

The navigation bar 134 on the dialog box 130 may include a search field 144, into which a user may type a search term. For example, the search term could be an address, an intersection, a state, a country, a landmark name, a business name, a latitude and longitude, etc. After entering a search term into the search field 144, the user may cause a search to be executed by, for instance, pressing the "Enter" key on a keyboard, or using a pointing device (e.g., a mouse) to "depress" a "Search" button 146. FIG. 4 depicts the dialog box 130 displaying an exemplary search result. The search field 144 has in it an address 150. The display area 132 in FIG. 4 depicts the area around the address 150 entered into the search field 144. A building 152 having the same address as the address 150 entered into the search field 144 is marked with a star 154.

Figure 5:
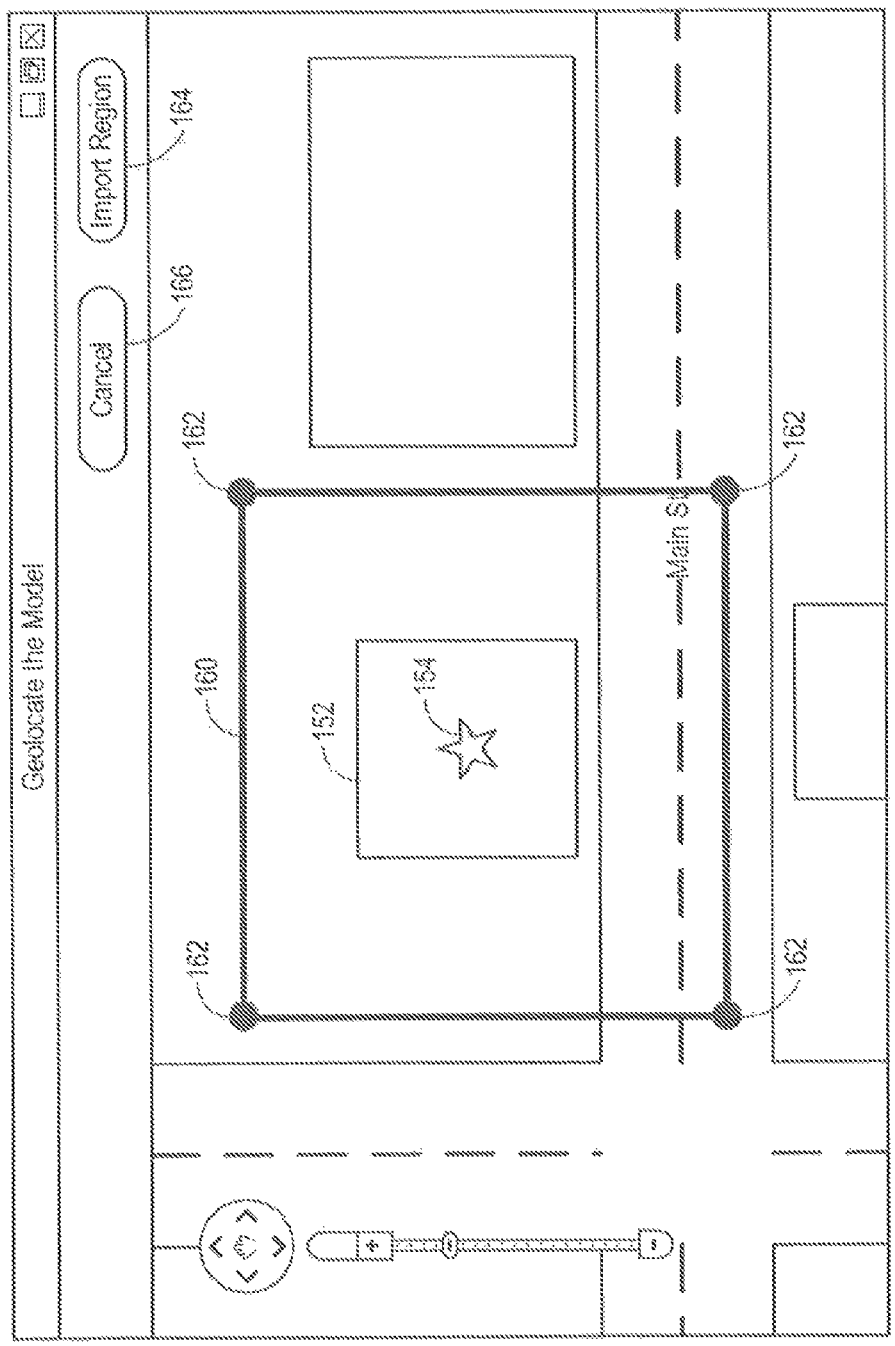
FIG. 5 depicts yet another screen of the dialog box of FIG. 3.

Once the desired area is displayed in the display area 132, a user may geolocate one or more points of the 3D model 100 in the 3D program space 106. In some embodiments, the user may select in the dialog box a particular point, such as a corner 156 of the building 152, and may associate the point with a point in the 3D program space 106. For example, the user may associate the corner 156 with the origin 120, with a point on the 3D model 100, or with any point in the 3D program space 106. By doing so, the set of coordinates of the selected point in the display 132 becomes associated with the selected point (e.g., the origin 120) in the 3D program space 106. In some embodiments, the user may instead activate a user interface control 148 (e.g., using an input device to select a button) and select a region of the display area 132 to import into the 3D program space 106. For example, and with reference to FIG. 5, activation of the control 148 may cause the dialog box 130 to display, in the same dialog box 130 or in a separate dialog box (not shown) a selection control 158. The selection control 158 may be, by way of example, a bounded area 160 adjustable by moving one or more of a plurality of vertices 162, each of which vertices may have associated with it a set of coordinates. Alternatively, the selection control 158 may be a fixed-shape (e.g., square, rectangular, circular, etc.) selection window having an adjustable size or even having a fixed size. In any event, controls 164 and 166 may, respectively, allow the user to import into the 3D program space 106 the region indicated (e.g., by the bounded area 160) or to cancel the selection and to return, for example, to the display depicted in FIG. 4.

Figure 6:
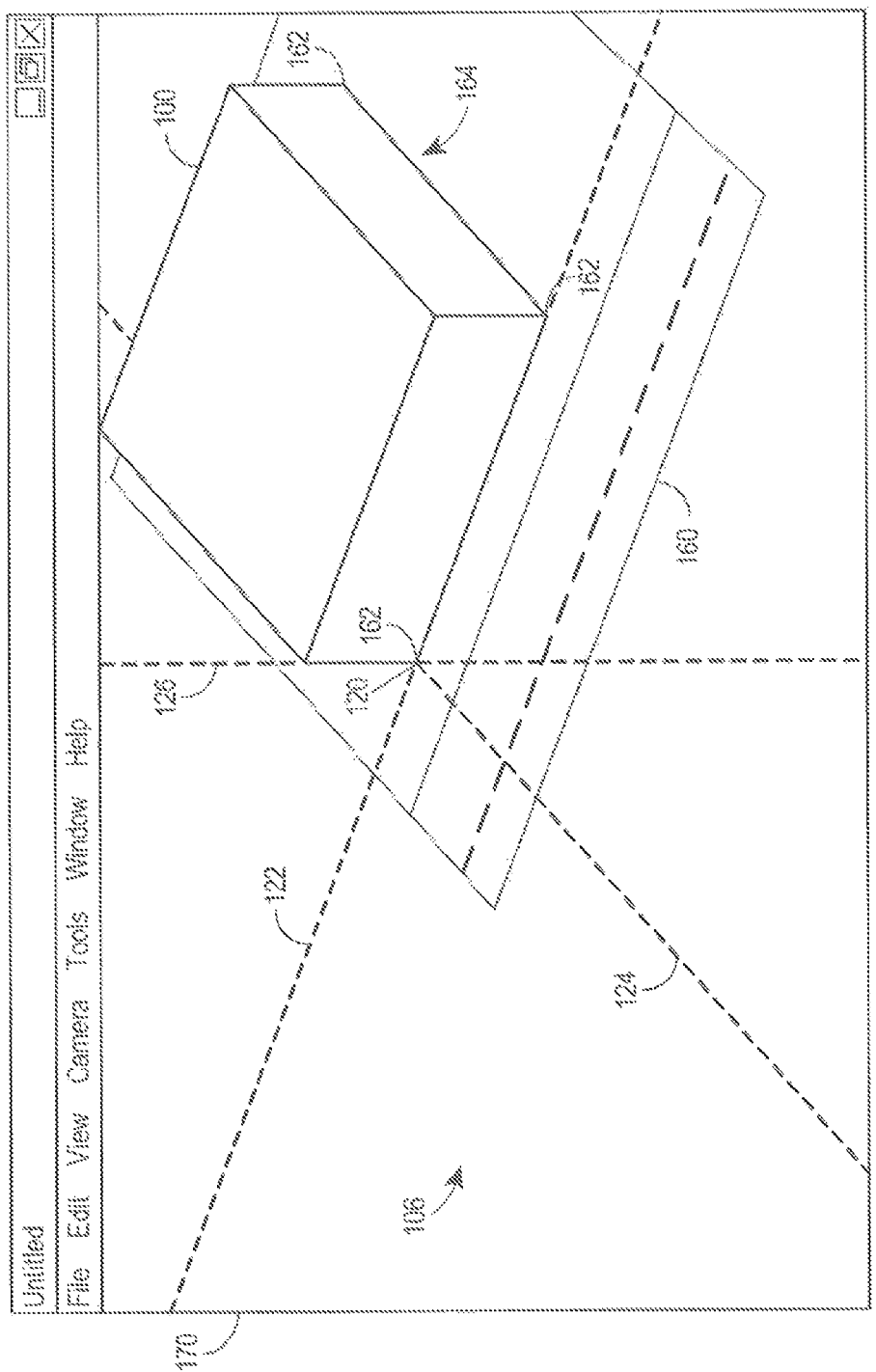
FIG. 6 depicts an exemplary geolocated space displayed in an application window in accordance with a presently described embodiment.

Activation of the control 164 may import the bounded area 160 into the 3D program space 106 of the modeling application 34, as illustrated in FIG. 6. FIG. 6 depicts an application window 170 that may be displayed on the display 20 during execution of the modeling application 34. The application window 170 depicts the 3D program space 106 with the X-, Y-, and Z-axes, 122, 124, and 126, respectively, meeting at the origin 120. The bounded area 160 is copied into the 3D program space 106 and may be displayed as a two-dimensional image (i.e., a plane). By default, the plane defined by the two-dimensional image of the bounded area 160 may be placed within the 3D program space 106 such that the plane is coincident with the plane defined by the X- and Y-axes 122 and 124, and may optionally be placed such that a center (not shown) of the bounded area 160 is coincident with the origin 120. In some embodiments, the user may be able to realign the origin 120 and/or the bounded area 160 to facilitate easier creation (or manipulation) of the 3D model 100. In FIG. 6, for example, the bounded area 160 and/or the origin 120 are aligned such that the corner 156 of the building 152 is aligned with the origin 120.

In some embodiments, every point within the bounded area 160 may have associated with it metadata indicating an altitude. The altitude may be relative to mean sea level, relative to the points next to it, relative to the center of the Earth, etc. Regardless of how the altitudes of various points within the bounded area are indicated, the bounded area 160 may be displayed selectively as either a 2D plane (as depicted in FIG. 6) or a 3D topography. Displaying the bounded area 160 as a 3D topography may allow the user to create the 3D model 100 with greater accuracy. In any event, the 3D model 100 may be constructed such that a base 164 of the 3D model 100 is coincident with the depiction of the building 152 and with the 2D planar depiction or 3D topography of the bounded area 160. Alternatively, the already-constructed 3D model 100 could be aligned with the depiction of the building 152 and with the 2D planar depiction or 3D topography of the bounded area 160.

Of course, with even a single point in the 3D program space 106 associated with a set of coordinates, every other point in the 3D program space 106 may be located referentially and assigned a corresponding set of coordinates. Thus, if the bounded area 160 is a square measuring 1000 feet per side, and the origin 120 is located at [X, Y, Z]=[150, 300, 0], one can determine that the vertices 162 of the bounded area 160 will be located at [−150, −300, 0], [850, −300, 0], [850, 700, 0], and [−150, 700, 0]. Likewise, every point within the 3D program space 106 may be determined relative to a point having known coordinates.

It should be understood that multiple coordinate systems may be in use within the system 10. For instance, the set of coordinates associated with the bounded area 160 in the database 42 and/or with each pixel within the display area 132, may comprise a latitude value and a longitude value (and possibly an altitude value), while the 3D program space 106 in the application 34 may associate each point therein with a set of X, Y, and Z coordinates. Nevertheless, so long as a single point within the 3D program space 106 is associated with a corresponding latitude and longitude, the corresponding latitude and longitude of every point within the 3D program space 106 may be calculated. Accordingly, the location of every point on any surface of the 3D model 100 may be specified by a first set of coordinates in the 3D program space 106 and by a second set of coordinates indicating a real-world position.

Figure 7:
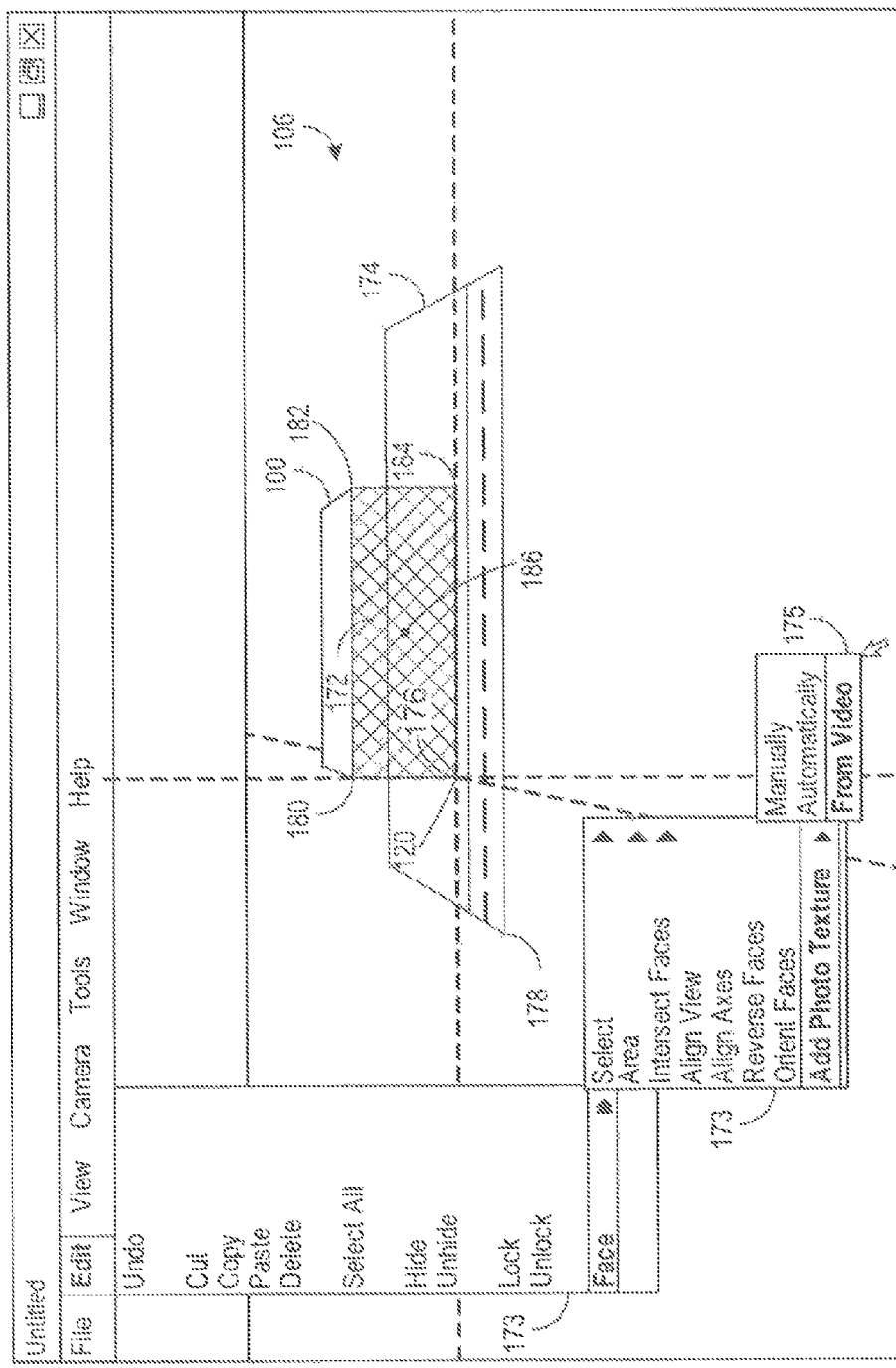
FIG. 7 illustrates an application window displaying a geolocated image and an associated model.

FIG. 7 depicts a geolocated image 174. The geolocated image 174 corresponds to the bounded area 160 and has at least one geolocated point. The geolocated point may be a point 176 corresponding to the origin 120, a point 178 corresponding to a vertex of the geolocated image 174, or any other point in the geolocated image 174. From that geolocated point, any point in the 3D program space 106 may likewise be geolocated. In some embodiments, the geolocated image 174 represents a ground plane in the 3D program space 106 and corresponds to the plane defined by the X- and Y-axes 122 and 124 (i.e., the Z=0 plane in the 3D program space 106). In some embodiments, the geolocated image 174 may, by default, be oriented in the 3D program space 106 such that the positive X-axis 122 is east of the origin 120, the positive Y-axis 124 is north of the origin 120, and the positive Z-axis 126 is above the ground (i.e., "up"). Additionally, in some embodiments, the geolocated image 174 may, by default, be placed in the 3D program space 106 such that the Z-axis 126 passes through the center of the geolocated image 174. Optionally, a user may adjust the origin 120 and, specifically, may adjust the origin 120 to correspond to a corner of the 3D model 100, as depicted in FIG. 7.

Once a geolocated, 3D model 100 is created in the 3D program space 106 of the modeling application 34, the user may select (e.g., using an input device such as a mouse, a touch screen, a stylus, etc.) a desired surface 172 to photo-texture as depicted in FIG. 7. The application 34 (which may be executing on the processor 24 or on a processor of the server 40) receives the selection. The selected surface 172 may have vertices 176, 180, 182, and 184 (if the selected surface 172 is a rectangle, for example) and a center point 186, each of which may be specified by a set of coordinates in the 3D space 106. In any event, having selected the surface 172, the user may activate a control causing the application 34 to execute the photo texturing routine 35. For example, in FIG. 7, the user is depicted selecting a command 175 from a series of pull-down menu items 173, as one of ordinary skill in the art would readily understand. Of course, the modeling application 34 could, additionally or alternatively, include a button control (not shown) that would cause execution of the photo texturing routine 35. In some embodiments, the modeling application 34 may give the user the option to execute a manual version of the photo texturing routine 35 or an automatic version of the photo texturing routine 35.

Figure 8:
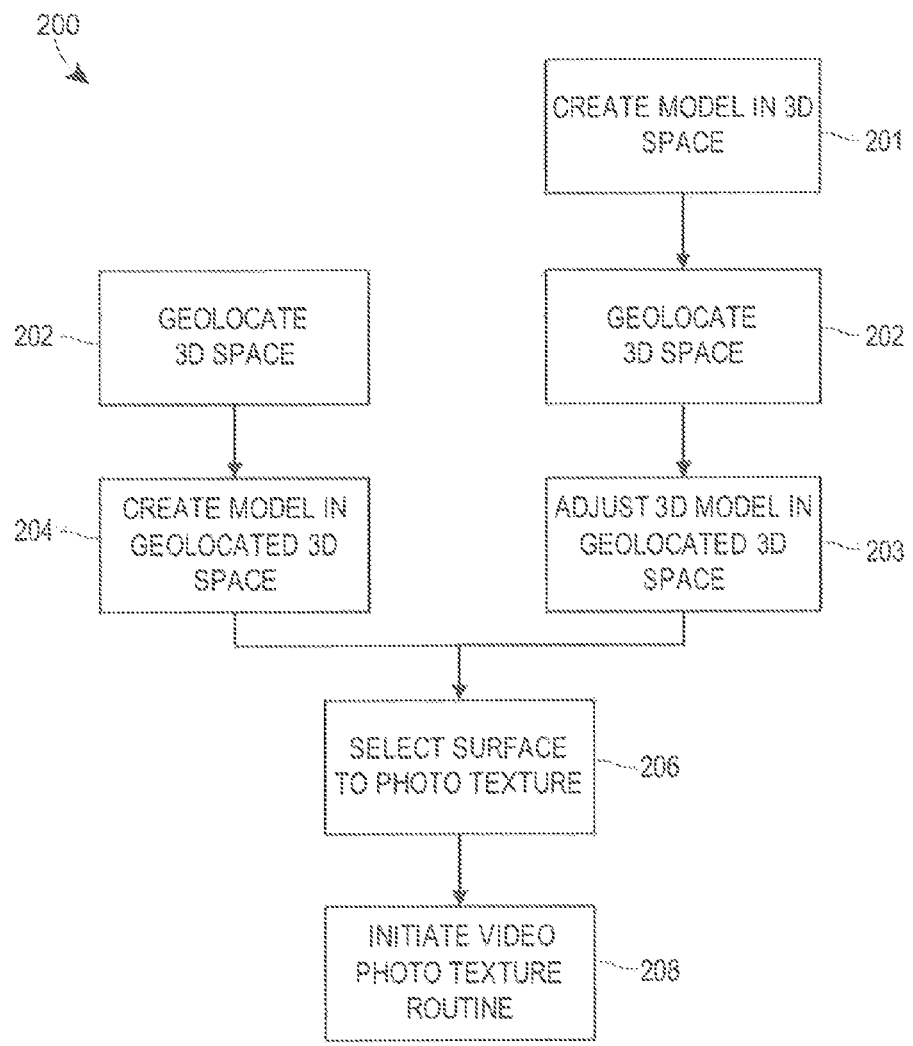
FIG. 8 depicts an exemplary method for automatically photo texturing a surface of a 3D model.
Figure 9:
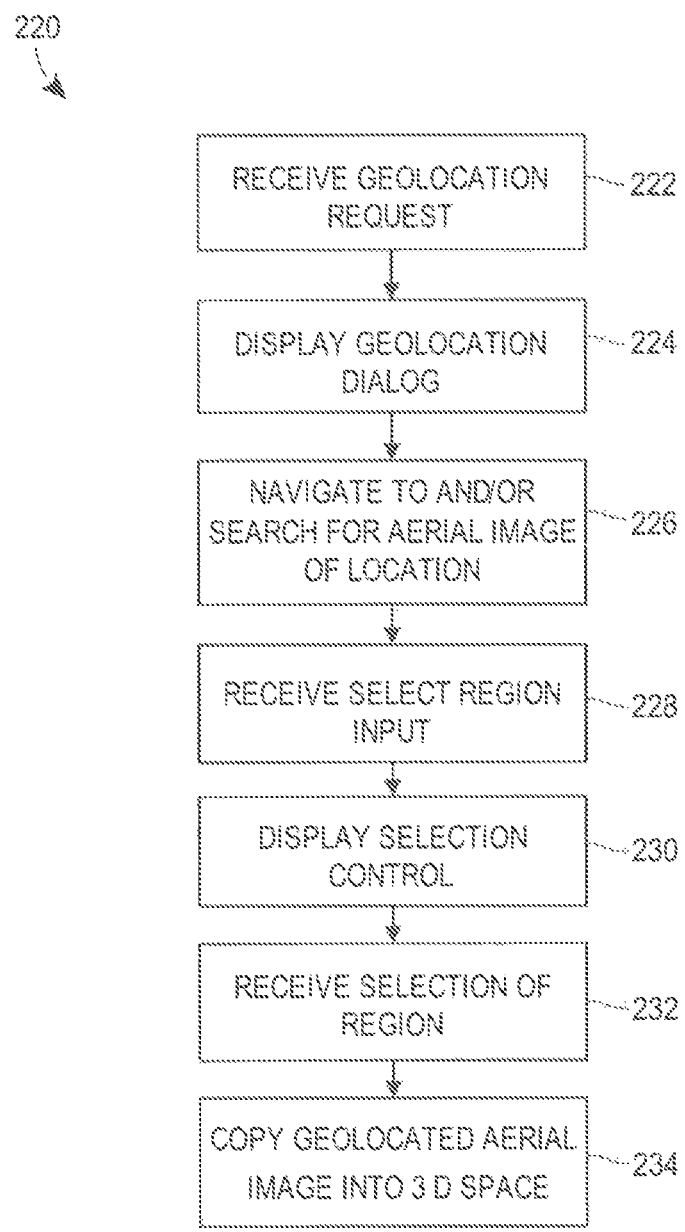
FIG. 9 depicts an exemplary method for performing geolocation of a 3D program space.

FIGS. 8 and 9 are flow charts illustrating, respectively, a method 200 for commencing the process of automatically photo texturing a surface (e.g., the surface 172) of a 3D model (e.g., the 3D model 100), and a method 220 for geolocating the 3D program space 106. Referring first to FIG. 8, as described above, the process of photo texturing the 3D model 100 may commence by geolocating the 3D program space 106 in which the 3D model 100 is to be created (block 202) and creating the 3D model 100 in the geolocated 3D program space 106 (block 204). In some embodiments, the process of photo texturing the 3D model 100 may instead commence by creating the 3D model 100 in the 3D program space 106 (block 201), geolocating the 3D program space 106 (block 202), and, if necessary, adjusting the 3D model 100 in the geolocated 3D program space 106 (block 203). Thereafter, a surface (e.g., the surface 172) to be photo textured may be selected (block 206) and the photo texturing routine 35 may be executed (block 208).

In any event, the geolocation process (block 202; method 220) commences when the application 34 receives a geolocation request (block 222) and, in response to receiving the request executes the geolocation routine 37 and displays a the geolocation dialog box 130 (block 224). As described above, the user may navigate to, or search for, an image (which may be an aerial image) of the desired location (i.e., the location of the real-world structure represented by the 3D model 100) (block 226). This may involve sending a search term from the routine 37 to the server 40, and receiving in response to the search term a corresponding image from the server 40, which image the server 40 may retrieve from the database 42. The user, having located in the geolocation dialog box 130 the desired region, may manipulate a control in the geolocation routine 37 to indicate a desire to select a region (block 228). In response to receiving the user input (block 228), the geolocation routine 37 may display a selection control (e.g., the bounded area 160 and the plurality of vertices 162) (block 230) and the user may manipulate the selection control to specify a desired area. The geolocation routine 37 may next receive a selection of a region (e.g. the bounded area 160) to copy into the 3D program space 106 of the application 34 (block 232). This may be accomplished, for example, when the user, having adjusted the vertices 162, indicates that the bounded area 160 is adjusted according to the user's desire by manipulating a control (e.g., clicking on a button) in the geolocation dialog box 130 (block 234). Having received the selection of a region, the geolocation routine 37 may copy the selected region of the geolocated image into the 3D program space 106 of the modeling application 34.

In embodiments, the geolocated image copied into the 3D program space 106 includes at least one geolocated point specified by a first coordinate system such as latitude and longitude (and, in some embodiments, altitude). Of course, while the geolocated point(s) are described herein as designated by latitude and longitude, the geolocated point(s) need not be specified by a latitude and longitude, but could instead be specified in any available coordinate system.

To automatically apply a photo texture to the selected surface 172, the application 34 and/or the photo texturing routine 35 may, perhaps cooperatively: (1) find one or more images of the real-world structure modeled by the 3D model 100; (2) select an image of the one or more images that includes the selected surface; (3) select from the selected image a portion corresponding to the selected surface; (4) map the selected portion to the selected surface; and (5) apply the selected portion to the selected surface according to the mapping. Accomplishing these tasks may require that the application 34 and/or the photo texturing routine 35 transform one or more sets of coordinates through several coordinate spaces. That is, the application 34 and/or the photo texturing routine 35 may operate or cooperate to change a point or a set of points from one coordinate system to another coordinate system. As but one example, the origin 120 depicted in FIG. 7 corresponds to a point [0, 0, 0] in the 3D program space 106 and may be geolocated as having a latitude $Lat_1$ and a longitude Lon1, i.e., specified by a point [Lat1, Lon!]. A point 100 meters north of the origin 120, 100 meters east of the origin 120, and 100 meters above the ground may correspond to a point [100, 100, 100] (assuming that the 3D program space 106 is measured in meters). That point may correspond to a location having latitude and longitude coordinates [Lat2, Lon2] where $Lat_2$ is $Lat_1$ plus a latitude increment equal to 100 meters and $Lon_2$ is $Lon_1$ plus a longitude increment equal to 100 meters.

Figure 10:
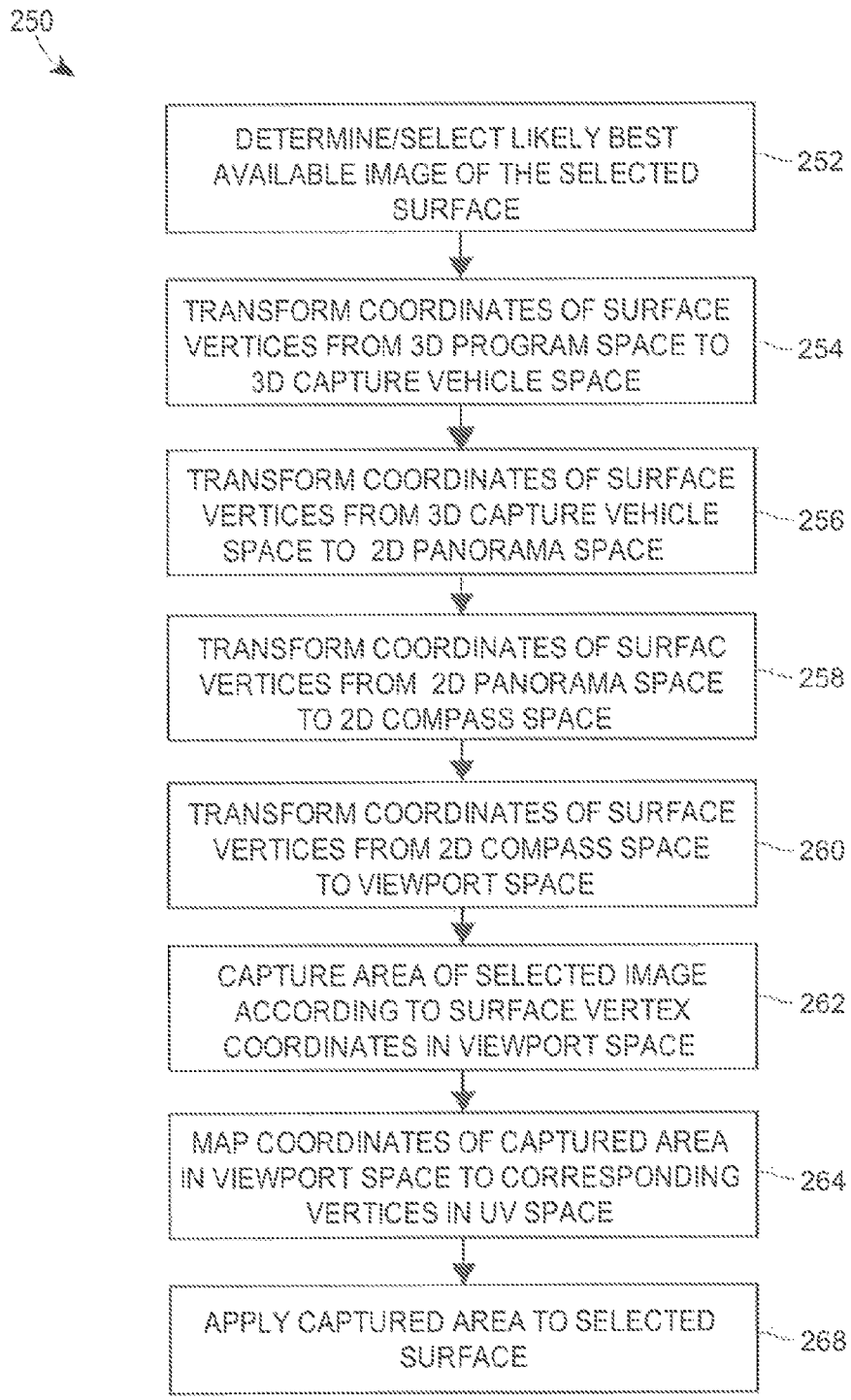
FIG. 10 depicts an exemplary method for automatically selecting and applying a photo texture to a selected surface of a 3D model.

Turning now to FIG. 10, a flow chart depicts an exemplary method 250, executed by the photo texturing routine 35, for automatically applying a photo texture to a selected surface (e.g., the selected surface 172). Of course, to automatically apply a photo texture to the selected surface, the photo texturing routine 35 attempts to find a suitable image of the selected surface. Specifically, the photo texturing routine 35 may send one or more search terms or requests to the server 40 to search geotagged images stored in the database 42 and, in particular, to search the data store 48 of images captured from street level.

Figure 11:
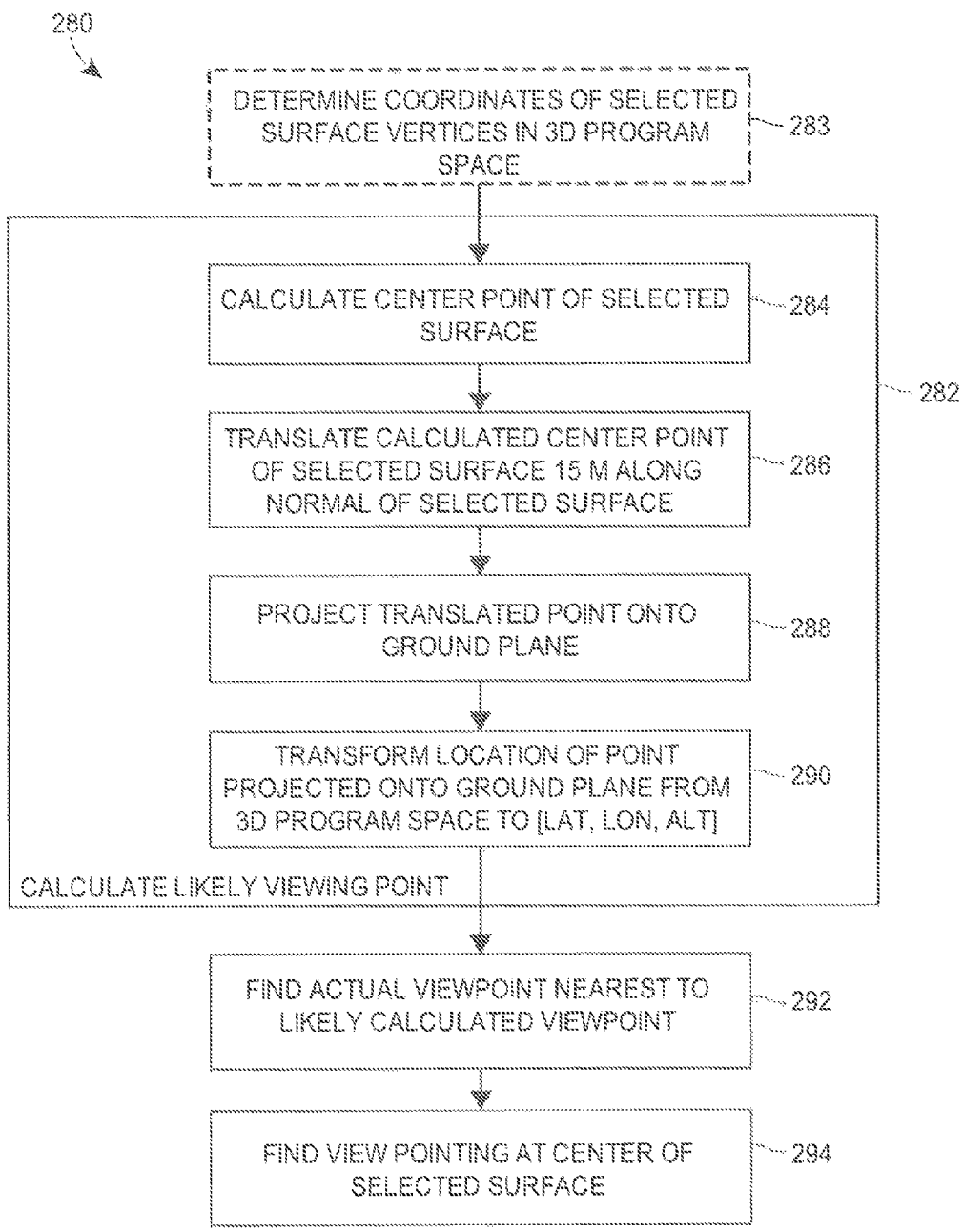
FIG. 11 depicts an exemplary method for determining and selecting a likely best available image of a selected surface of a 3D model.

To determine and select the likely best available image of the selected surface 172 from the database 42 (block 252), the photo texturing routine 35 may execute a method 280 depicted in FIG. 11. The method 280 begins by calculating in the photo texturing routine 35 a likely viewing point from which an image of the selected surface 172 might be captured (blocks 282). In some embodiments, the first step in calculating the likely viewing point is calculating, determining, or retrieving a set of coordinates corresponding to the center point 186 of the selected surface 172 (block 284). In various embodiments, the set of coordinates corresponding to the center point 186 of the selected surface 172 may be calculated or determined by the modeling application 34 and stored for later retrieval and use by the photo texturing routine 35. However, in some embodiments, the set of coordinates corresponding to the center point 186 of the selected surface 172 may be calculated or otherwise determined by the photo texturing routine 35, and may include first determining for each of the vertices 176, 180, 182, and 184 a set of coordinates corresponding to the location in the 3D space 106 of the vertex (block 283). Further, in some embodiments, the selected surface 172 may be represented by a set of vertices (e.g., a set of four vertices) even if the selected surface 172 is not rectangular. For example, the selected surface 172 could be a circular surface, specified by four vertices defining a square circumscribing the circular surface.

Figure 12:
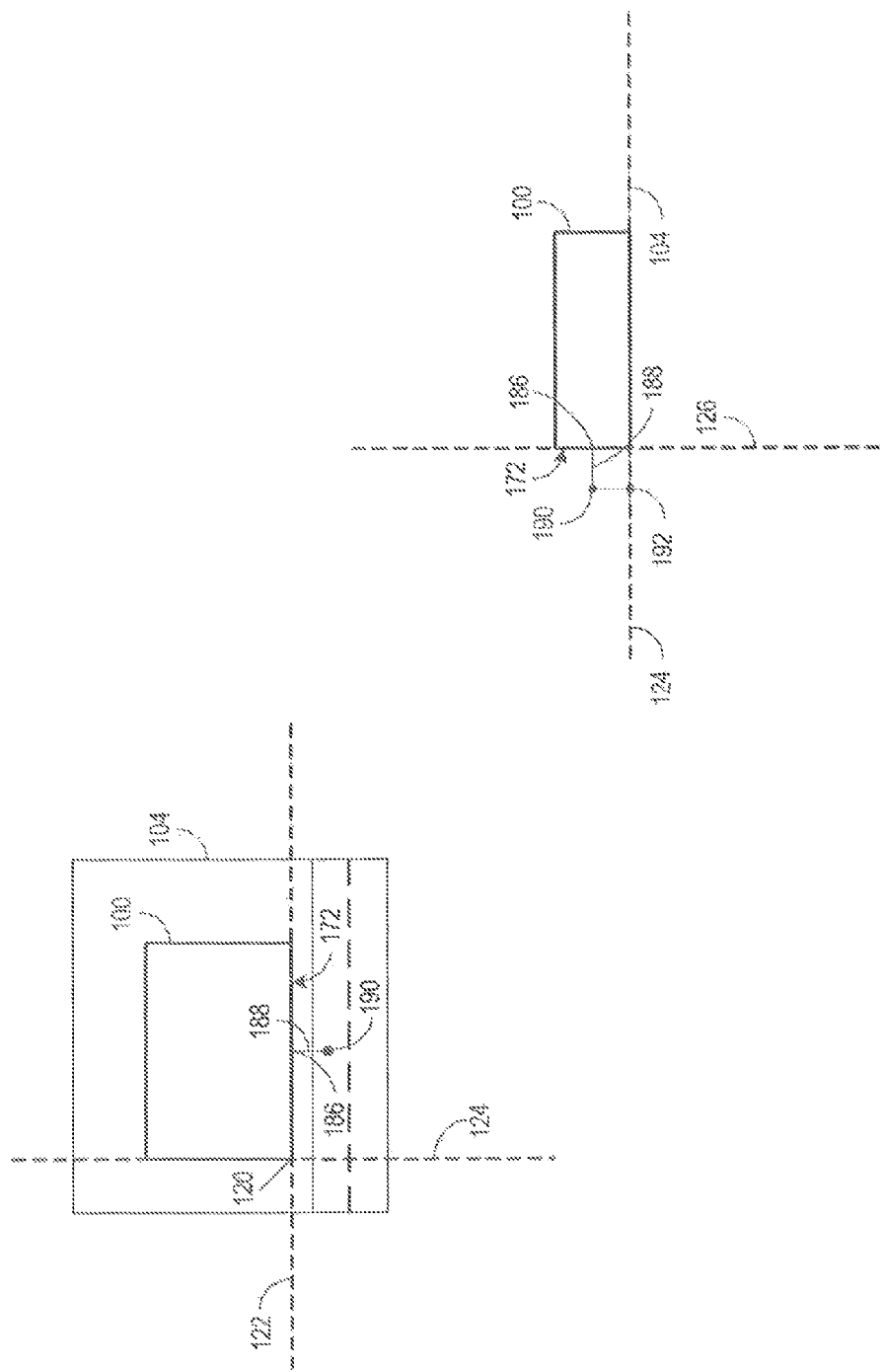
FIG. 12 illustrates the process of calculating a likely viewing point in accordance with the method of FIG. 11.

Referring now to FIGS. 11 and 12, to determine a likely best available image of the selected surface, the photo texturing routine 35 may next translate the center point 186 a predefined distance (e.g. 15 meters) along the normal 188 of the selected surface 172 (block 286). The photo texturing routine 35 may then project this translated point 190 onto the ground plane 104 (block 288) to determine a position 192 from which an image is likely to have been captured. A set of coordinates in the 3D program space 106 corresponds to the position 192. The photo texturing routine 35 may then transform this set of coordinates from the 3D program space 106 to a set of coordinates used to geotag the images in the data store 48 (e.g., latitude, longitude, and altitude) (block 290).

Having determined a set of coordinates of the likely viewing point 192 from which an image of the selected surface 172 might have been captured, the photo texturing routine 35 may send to the server 40 a request to search the data store 48 for one or more images having geotags indicating they were captured from the points nearest the likely viewing point 192. In some embodiments, the photo texturing routine 35 calls a sub-routine (e.g., Javascript™, etc.) that, via an API, requests the server 40 to find an image captured from a position nearest the calculated likely viewing point 192 (block 292). This may be accomplished, for example, by transmitting to the server 40 the latitude and longitude coordinates for the calculated likely viewing point 192 and receiving from the server 40 in return latitude and longitude coordinates specifying the nearest location for which an image exists in the data store 46. For example, FIG. 13 depicts a set of points 194A-J. Each of the set of points 194A-J may represent a point from which an image stored in the data store 48 was captured. Each of the images captured from the points 194A-J may be, for example, a panoramic image capturing a 360-degree view from the respective point 194A-J, in which case any image captured from a point "in front of" the plane of the surface 172 (e.g., from the points 194C-J) may include a view of the surface 172. Alternatively, each image in the data store 46 may be a single (i.e., non-panoramic) image, and the data associated with the image may, in addition to indicating the location from which the image was captured, indicate the direction the image capture device was pointed, the zoom level of the image, the size of the viewport, etc. In either event, the sub-routine or the photo texturing routine 35 may, in some embodiments, evaluate the points 194A-J to determine whether images stored in the data store 46 and captured from points equidistant from the likely viewing point 192 as to respective likelihood that the selected surface 172 is visible in the image. (For example, the selected surface 172 would not be visible from the points 194A or 194B in FIG. 13, because images captured from these locations were taken from "behind" the plane of the surface 172.) In FIG. 13, the point 194H represents the point nearest to the likely viewing point 192, and the image in the data store 46 captured from the point 194H corresponds to the image captured nearest to the likely viewing point 192. The photo texturing routine 35 may store in the memory sub-system 26 (e.g., in the RAM 29) the latitude and longitude coordinates returned by the sub-routine and specifying the nearest point 194H from which an image exists and/or may store an identifier of a panoramic image captured from the nearest point 194H.

In the case of a panoramic image, the photo texturing routine 35, having received a set of coordinates for and/or an identifier of a panoramic image captured from a point (e.g., the point 194H) nearest the likely viewing point 192, finds the view of the panoramic image that points at, or closest to, the center point 186 of the selected surface (block 294). The view of the panoramic image may be specified by a set of point-of-view (POV) parameters including, by way of example and not limitation, one or more of: a panorama identifier, a panorama location (e.g., latitude and longitude coordinates), a heading, a zoom level, a pitch, etc. Determining the POV parameters may, in some embodiments, require the coordinates of the center point 186 to undergo a set of transformations as described below with respect to FIG. 10 and, in particular, with respect to blocks 254-262.

Referring to FIG. 10, the photo texturing routine 35, having received data specifying a set of coordinates for and/or an identifier of a panoramic image captured from the point 194H nearest the likely viewing point 192, and possibly also one or more POV parameters specifying an image taken from the panoramic image and centered about to the center point 186 of the selected surface 172, next performs a series of transformations for the coordinates of each of the vertices 176, 180, 182, 184 of the selected surface 172 (blocks 254-268). While the exemplary series of transformations described below is specific to a described embodiment of the 3D modeling system 10 described herein, it should be understood that in other embodiments, certain ones of the transformations may be omitted and/or other transformations may be necessary. Moreover, while each of the series of transformations is described separately with respect to the method 250, the transformations may be combined into a single transformation (i.e., a single equation or matrix operation may accomplish all of the necessary transformations).

In an embodiment, the method 280 depicted in FIG. 11 returns a result (FIG. 10 at block 292) including data specifying (e.g., with an image identifier) a panoramic image captured at the point 194H nearest to the position 192, or returns a result specifying coordinates of a point 194H from which such a panoramic image would have been captured, and the metadata associated with the panoramic image.

Figure 14A:
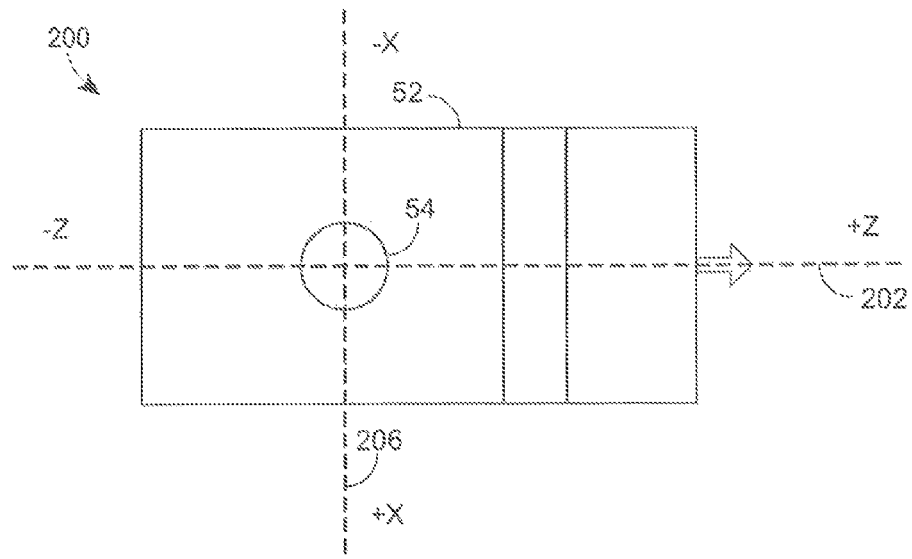
FIG. 14A depicts first and second axes of an exemplary coordinate system related to a 3D vehicle space.
Figure 14B:
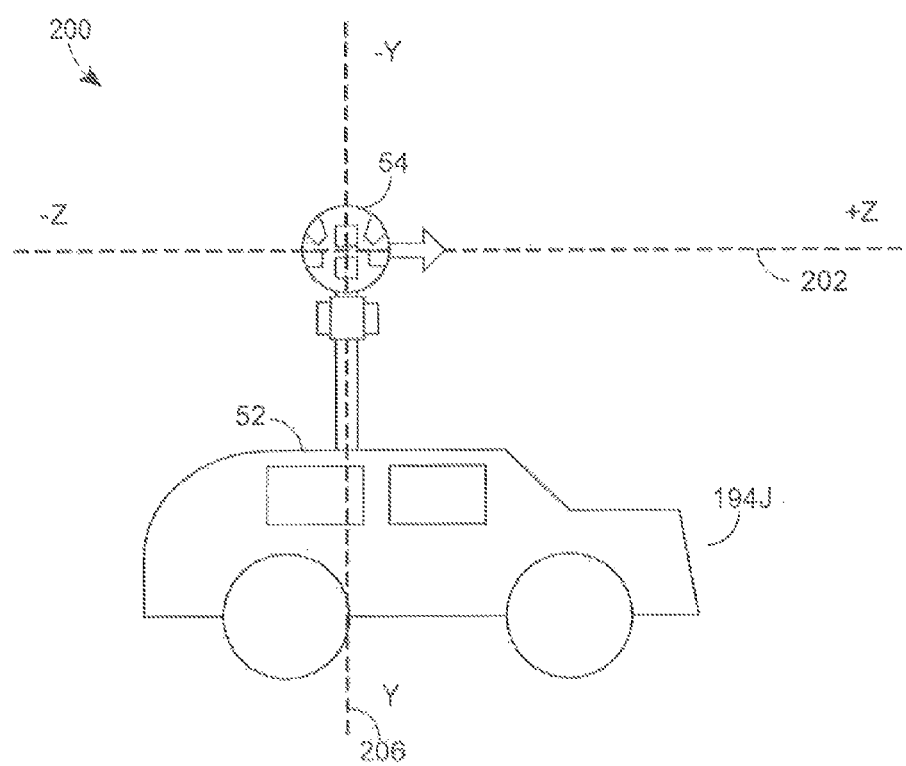
FIG. 14B depicts second and third axes of the coordinate system of FIG. 14A.

In one transformation, the set of coordinates for each of the vertices 176, 180, 182, 184 of the selected surface 172 is transformed from the 3D model space 106 to a 3D vehicle space 200, specified by a set of rectangular coordinates [X, Y, Z] (FIG. 10 at block 254). As depicted in FIGS. 14A and 14B, the 3D vehicle space 200 is centered at the sensor pod 54 when the vehicle 52 is located at the point 194H. The 3D vehicle space 200 is oriented with a positive Z axis 202 aligned with the direction of travel of the vehicle 52 (which may be stored as metadata associated with the image captured from the point 194H, or may be determined by evaluating the locations 194G, 194I from which adjacent images were captured), a positive Y axis 204 extending below the vehicle 52, and a positive X axis 206 extending to the right of the vehicle 52. In this manner, the location of each of the vertices 176, 180, 182, 184 of the selected surface 172 can be determined relative to the sensor pod 54 at the point 194H (i.e., the location of the sensor pod 54 when the desired image was captured). The set of coordinates for each of the vertices 176, 180, 182, 184 in the 3D vehicle space 200 may be stored in the memory sub-system 26 for later use.

Figure 15A:
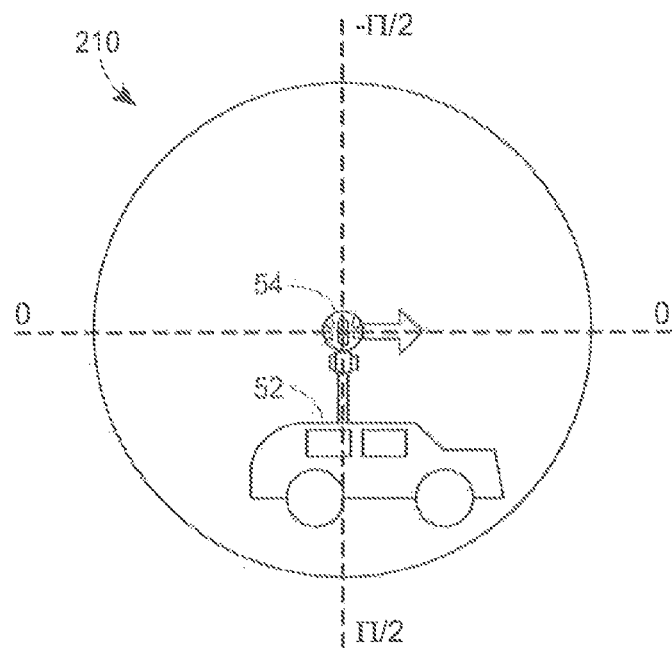
FIG. 15A depicts a first parameter of an exemplary 2D coordinate system describing an aspect of the 3D vehicle space of FIGS. 14A and 14B.
Figure 15B:
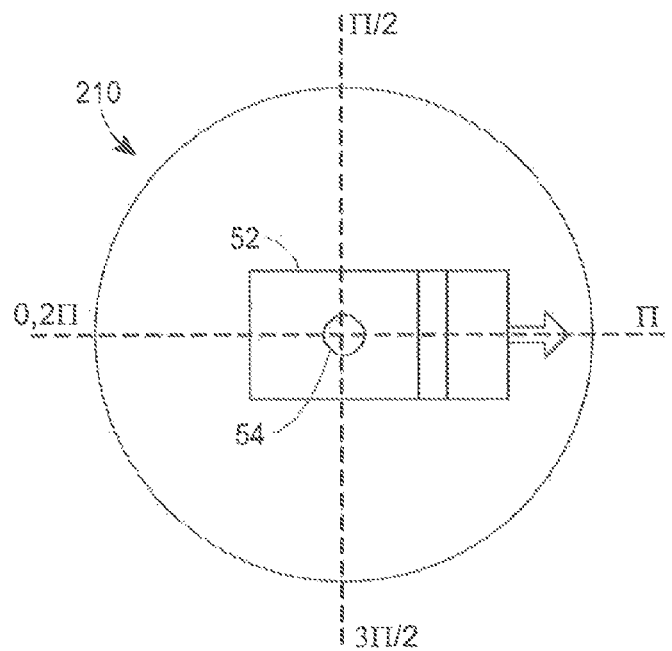
FIG. 15B depicts a second parameter of the 2D coordinate system of FIG. 15A.
Figure 15C:
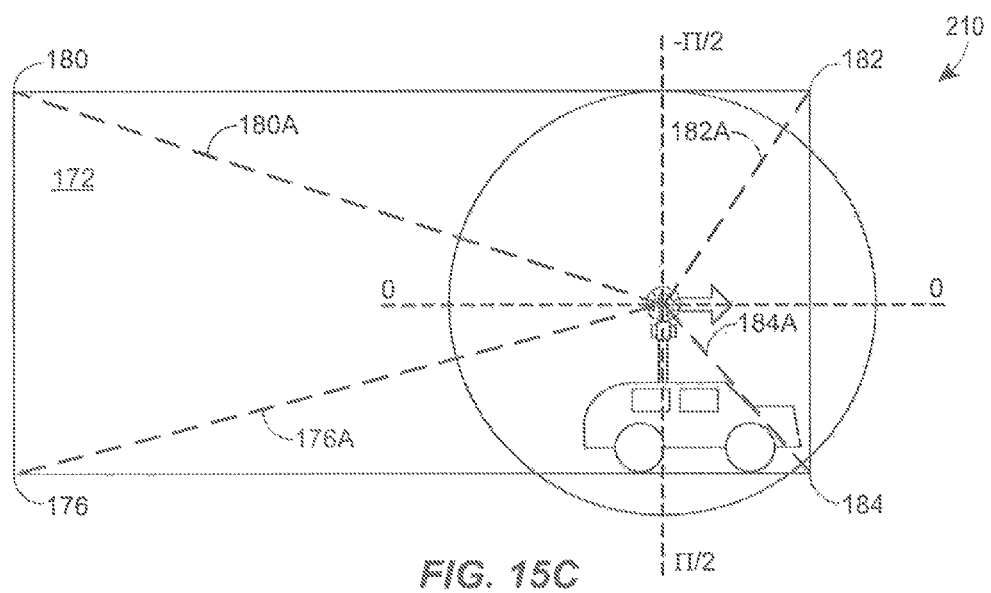
FIG. 15C illustrates the description by the 2D coordinate system of FIGS. 15A and 15B of a selected surface of a 3D model.
Figure 15D:
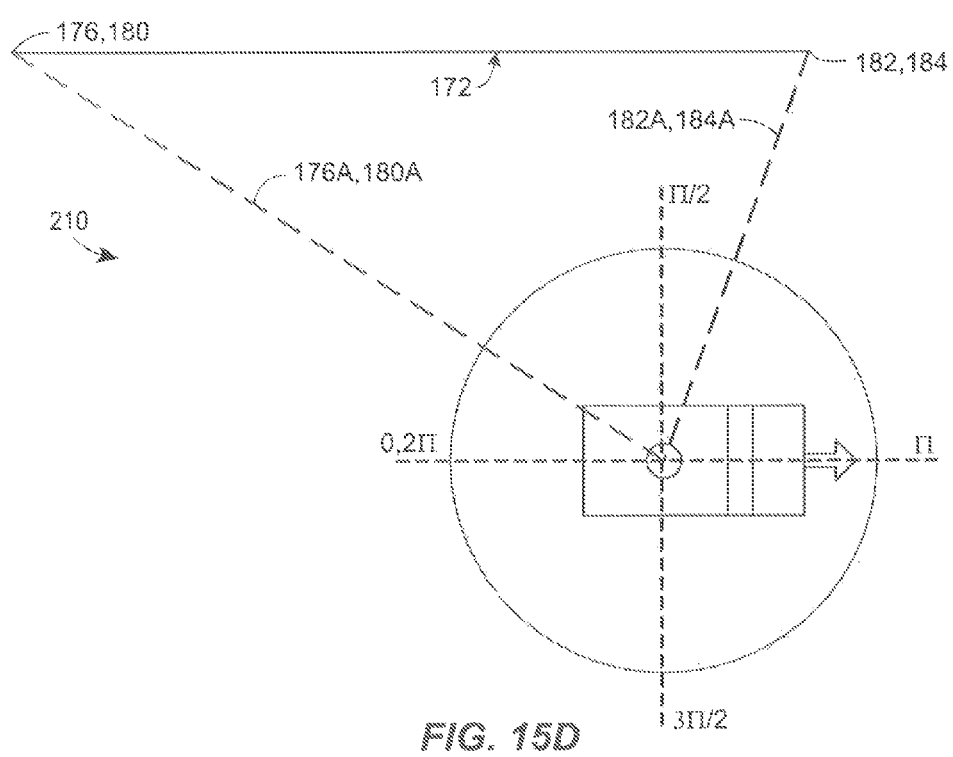
FIG. 15D depicts a second parameter of the 2D coordinate system of FIG. 15C.

In another transformation, the set of coordinates for each of the vertices 176, 180, 182, 184 of the selected surface 172 is retrieved from the memory sub-system 26 and each set of coordinates transformed from the 3D vehicle space 200 to a 2-dimensional (2D) panorama space 210, specified by a pair of coordinates [P, Y] indicating, respectively, pitch and yaw (FIG. 10 at block 256). As depicted in FIGS. 15A and 15B, the 2D panorama space is defined with respect to the sensor pod 204. The pitch is defined from –n/2 to n/2, from top to bottom, while the yaw is defined from 0 to 2n, with n indicating the direction of the motion of the vehicle 202. Thus, with reference to FIGS. 15C and 15D, respectively, the pitch and yaw of each of the vertices 176, 180, 182, 184 of the selected surface 172 may be determined, specifying the coordinates on an imaginary sphere at which a line 176A, 180A, 182A, 184A, from each of the vertices 176, 180, 182, 184 to the sensor pod 54 intersects the sphere. The set of coordinates for each of the vertices 176, 180, 182, 184 in the 2D panorama space 210 may be stored in the memory sub-system 26 for later use.

Figure 16:
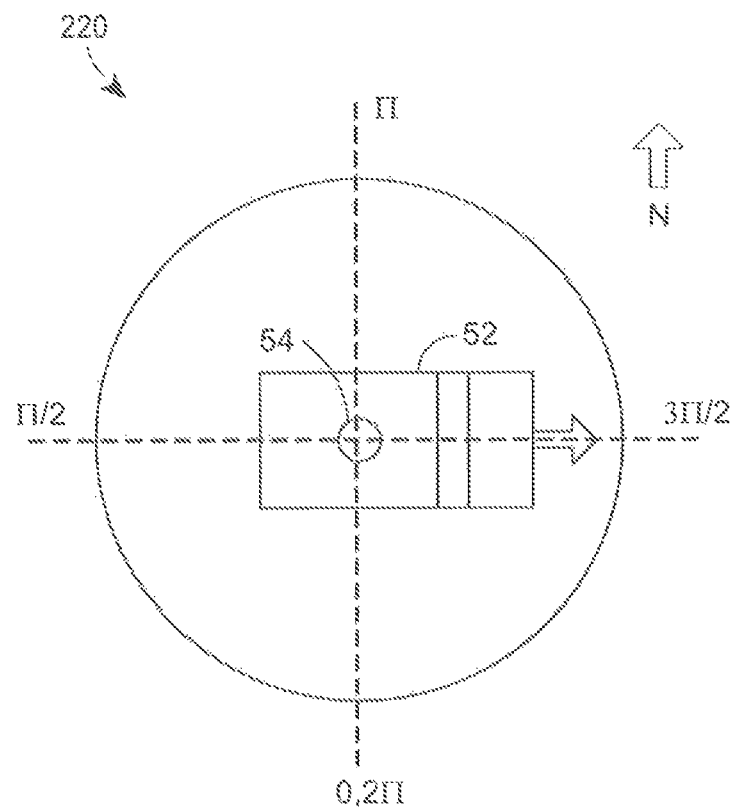
FIG. 16 depicts an alternative second parameter for the 2D coordinate system of FIGS. 15A and 15B.

In still another transformation, the set of coordinates for each of the vertices 176, 180, 182, 184 of the selected surface 172 is retrieved from the memory sub-system 26 and each set of coordinates transformed from the 2D panorama space 210 to a 2D compass space 220 (FIG. 10 at block 258), specified by the same pair of coordinates as the 2D panorama space 210, but with a yaw value defined with respect to north, instead of with respect to the direction the vehicle 52 is moving. For example, FIG. 16 shows the yaw values as in FIG. 15A, with n indicating north. Thus, if all panoramic images in the data store 46 are stored such that a rotational parameter (i.e., yaw) is relative to north, the transformation accomplished in block 258 provides for each of the vertices 176, 180, 82, 184 a yaw value relative to north. The set of coordinates for each of the vertices 176, 180, 182, 184 in the 2D compass space 220 may be stored in the memory sub-system 26 for later use.

Referring for a moment to FIG. 17A, sets 300, 302, 304 of coordinates A, B, C, D are shown for a special case when the point 194H from which an image was captured is the same as the calculated likely viewing point 192, with the sensor pod 54 located 2.5 meters above the ground plane 104, and the selected surface 172 having a width of 30 meters and a height of 5 meters. Under these special conditions, the vertices 176 and 184 are coplanar with the likely viewing point 192, and the center of the sensor pod 54 is coincident with the point 190 translated from the center point 186 along the normal 188 of the surface 172. FIG. 17B, meanwhile, illustrates the calculation of the angles in 2D panorama space 210 and 2D compass space 220, which is readily understood with basic trigonometric principles.

Figure 18A:
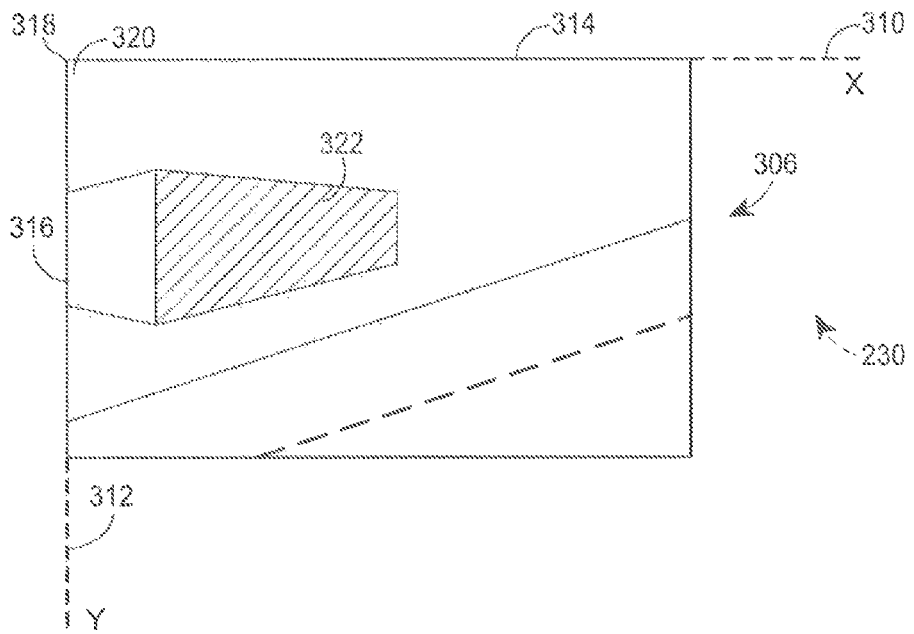
FIG. 18A illustrates a first exemplary image having a first selected portion thereof that an application may use to photo texture a selected surface of 3D model in accordance with a presently described embodiment.
Figure 18B:
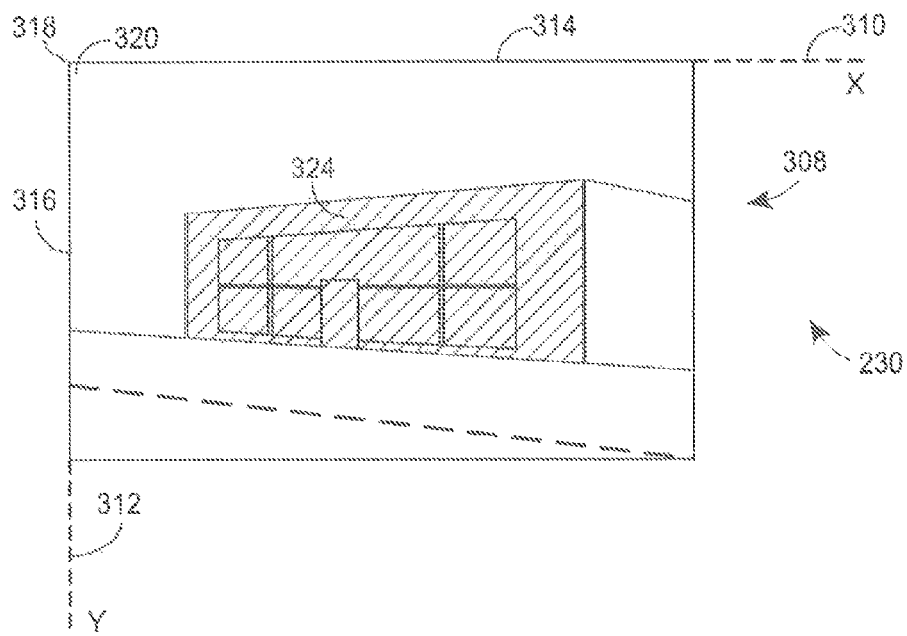
FIG. 18B illustrates a second exemplary image having a second selected portion thereof that an application may use to photo texture a selected surface of 3D model in accordance with a presently described embodiment.

In another transformation still, the set of coordinates for each of the vertices 176, 180, 182, 184 of the selected surface 172 is retrieved from the memory sub-system 26 and each set of coordinates transformed from the 2D compass space 220 to a 2D viewport space 230 (FIG. 10 at block 260), specified by X and Y coordinates indicating a point on an image captured at the point 194H. The image may be one of the images forming or included in the panoramic image captured at the point 194H and, in particular, may be the image specified by the POV parameters. X- and Y-axes 310 and 312 extend, respectively, along a top side 314 and a left side 316 of the image, from an origin 318 at a top left corner 320 of each image. FIGS. 18A and 18B depict potential 2D images 306, 308 that may correspond to images captured from two different angles. For instance, the image 306 may correspond to a portion of a panoramic image captured at the point 194F, while the image 308 may correspond to a portion of a panoramic image captured at the point 194H. The transformation from 2D compass space 220 to 2D viewport space 230 (block 260) may be based, in part, on the zoom level of the image, the angle of the particular camera 206 that captured the image, on POV parameters for the particular image, on metadata in the data store 46 indicating the bounds of the image in 2D compass space, 2D panorama space, etc., the type of lens used to capture the image, data captured by the range scanners 210, or some combination of these. The set of coordinates for each of the vertices 176, 180, 182, 184 in the 2D viewport space 230 may be stored in the memory sub-system 26 for later use.

The photo texturing routine 35, having determined a panoramic image including all of the vertices 176, 180, 182, 184 (or a location from which such a panoramic image was captured), determined a POV image that includes the vertices 176, 180, 182, 184, and determined (through the various transformations 254-260) the coordinates of the vertices 176, 180, 182, 184 in the image, may retrieve some or all of the data from the memory sub-system 26 and or the data store 46. Specifically, the photo texturing routine 35 may retrieve from the memory sub-system 26 a unique identifier of the panoramic image or a set of coordinates specifying the location from which the panoramic image was captured. The photo texturing routine 35 may, using the identifier or the coordinates, request from the database 42, via the server 40 and the API, the panoramic image corresponding to the identifier or the coordinates. In some embodiments, the photo texturing routine 35 may request via the API a particular one of the images included in the panoramic image or, alternatively, may specify POV parameters (e.g., a value of pitch and/or yaw in either the 2D panorama space 210 or the 2D compass space 220), and may receive from the database 42, via the server 40 and the API, an image corresponding to the request.

Thereafter, the photo texturing routine 35 may define an area of the received image according to the coordinates of the vertices 176, 180, 82, 184 in the 2D viewport space 330.

FIG. 18A depicts one such area 322 in the image 306, while FIG. 18B depicts another such area 324 in the image 308. The photo texturing routine 35 may capture the area 322, 324 (FIG. 10 at block 262) and store the corresponding data in the memory sub-system 26.

In some embodiments, the photo texturing routine 35 may evaluate whether any one image in the panoramic image captured at the point 194H includes all four of the vertices 176, 180, 182, 184. If, for example, the vertices 176 and 184 are in a first image of the panoramic image (or a first point of view of the panoramic image) and the vertices 180 and 182 are in a second image of the panoramic image (or a second point of view of the panoramic image), the photo texturing routine 35 may search for an image captured from a more distant point, such as from one of the points 194F, 194G, or 194I, or may seek a point of view that includes all four of the vertices 176, 180, 182, 184 (e.g., a point of view with a wider field of view). Alternatively, in some embodiments, the photo texturing routine 35 may retrieve from the data store 46 both the first and second images from the panoramic images and capture respective portions of each.

The final steps in the method 250 of for automatically applying a photo texture to the selected surface 172 are related to UV mapping. UV mapping is widely known process for applying a texture to a 3D object and, accordingly, will not be described in great detail herein. Briefly, however, the process of UV mapping involves applying a 2D mesh to a 3D object (e.g., the model 100 in the 3D model space 106), unwrapping the mesh, creating the texture on the mesh, and applying the texture to the 3D object. Thus, the photo texturing routine 35 may map the coordinates, in viewport space, of the captured area 322, 324 to the corresponding vertices in UV space (FIG. 10 at block 264) and apply the captured area 322, 324 to the selected surface 172 of the 3D model 100 in the modeling application 34, as depicted, for example, in FIG. 19.

In some embodiments, the 3D modeling application 34 may call (i.e., instantiate) the photo texturing routine 35 multiple times, successively or concurrently, to photo texture multiple surfaces of the 3D model 100. For example, prior to initiating the automatic photo texturing routine 35 (FIG. 8 at block 208), a user may select multiple surfaces of the 3D model 100 (FIG. 8 at block 206). Alternatively, the user may select the 3D model 100 before initiating the automatic photo texturing routine 35, and the routine 35 may automatically photo texture every surface of the 3D model 100 for which imagery is available within the database 42.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 16 may include but is not limited to any combination of a LAN, a MAN, a WAN, a mobile, a wired or wireless network, a private network, or a virtual private network. Moreover, while only one workstation 18 is illustrated in FIG. 1 to simplify and clarify the description, it is understood that any number of workstations 18 are supported and can be in communication with the server 40.

Additionally, certain embodiments are described herein as including logic or a number of components, modules, routines, applications, or mechanisms. Applications or routines may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently or semi-permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APis)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a photo texturing system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for photo texturing 3D models through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for applying photo texturing to a 3D model of a real-world object, the method comprising:
receiving a user request, with one or more computing devices, to view a geolocated 3D model from a particular viewing position, the particular viewing position being associated with a 3D program space;
comparing, with the one or more computing devices, a 3D location of a surface of the geolocated 3D model to one or more locations of a plurality of geolocated images to select one geolocated image of the plurality of geolocated images to use to apply an image texture to the surface of the geolocated 3D model, wherein comparing further comprises:
determining a likely viewing point associated with the particular viewing position associated with the user request, the likely viewing point comprising a set of geolocated coordinates specifying an estimate of the particular viewing position the likely viewing point being determined by determining a first point at a fixed distance along the normal of the surface from a point on the surface;
determining one or more geolocated images of the plurality of geolocated images captured from a position proximate the likely viewing point; and
determining which of the one or more geolocated images of the plurality of geolocated images was captured from an angle closest to an angle between the likely viewing point and the surface;
selecting, with the one or more computing devices, an image of the plurality of geolocated images based at least in part on the comparison;
selecting, with the one or more computing devices, an area of the selected image to apply to the surface;
applying, with the one or more computing devices, the selected area of the selected image to the surface; and
providing for display, with the one or more computing devices, the surface applied with the selected area of the selected image.

2. The method of claim 1, wherein comparing a 3D location of a surface of the geolocated 3D model to one or more locations of a plurality of geolocated images to select one geolocated image of the plurality of geolocated images to use to apply an image texture to the surface comprises selecting an image that depicts the surface.

3. The method of claim 2, wherein comparing a 3D location of a surface of the geolocated 3D model to one or more locations of a plurality of geolocated images to select one geolocated image of the plurality of geolocated images to use to apply an image texture to the surface comprises selecting a point of view of a panoramic image captured at the real-world location.

4. The method of claim 1, wherein comparing a 3D location of a surface of the geolocated 3D model to one or more locations of a plurality of geolocated images to select one geolocated image of the plurality of geolocated images to use to apply an image texture to the surface further comprises determining a location of the vertices of the surface.

5. The method of claim 4, wherein selecting an area of the selected image to apply to the surface comprises selecting, with the one or more computing devices, an area of the selected image to apply to the surface based at least in part on the location of the vertices of the surface.

6. The method of claim 1, further comprising:
determining the location of two or more vertices of the surface; and
performing a plurality of transformations for each of the two or more vertices to transform each of the vertices through a plurality of coordinate spaces.

7. A system comprising:
a network;
a database communicatively coupled to the network, the database storing a plurality of images, each image having associated with it a set of information specifying at least the location at which the image was captured;
a display device;
one or more computing devices communicatively coupled to the database via the network and to the display device; and
a memory device storing a set of machine readable instructions executable by the one or more computing devices, the instructions operable to cause the one or more computing devices to:
receive a user request to view a 3D model having at least one geolocated point from a particular viewing position the particular viewing position being associated with a first coordinate space;
compare a 3D location of a surface of the 3D model to one or more locations of a plurality of geolocated images to select one geolocated image of the plurality of geolocated images to use to apply an image texture to the surface, wherein the instructions operable to cause the one or more computing devices to compare a 3D location of the surface of the 3D model to one or more locations of a plurality of geolocated images to select one geolocated image of the plurality of geolocated images to use to apply an image texture to the surface further comprise instructions operable to cause the one or more computing devices to:
determine a likely viewing point associated with the particular viewing position associated with the user request, the likely viewing point comprising a set of geolocated coordinates specifying an estimate of the particular viewing position, the likely viewing point being determined by determining a first point at a fixed distance along the normal of the surface from a point on the surface;
determine one or more geolocated images of the plurality of geolocated images captured from a position proximate the likely viewing point; and
determine which of the one or more geolocated images of the plurality of geolocated images was captured from an angle closest to an angle between the likely viewing point and the surface;
select an image of the plurality of geolocated images based at least in part on the comparison;
select an area of the selected image to apply to the surface;
apply the selected area of the selected image to the surface; and
provide for display the surface applied with the selected area of the selected image.

8. The system of claim 7, wherein the instructions operable to cause the one or more computing devices to select an image of the plurality of geolocated images based at least in part on the comparison further comprise instructions operable to cause the one or more computing devices to:

select from the database an image captured from a location near the likely viewing point.

9. The system of claim 7, wherein the instructions operable to select an area of the selected image to apply to the surface further comprise instructions operable to cause the one or more computing devices to:
determine coordinates of two or more vertices of the surface, the coordinates in the first coordinate space;
transform the determined coordinates for each of the two or more vertices from the first coordinate space to at least a second coordinate space, the determined coordinates in the second coordinate space corresponding to the respective positions in the selected image of the two or more vertices.

10. The system of claim 9, wherein the instructions operable to select an area of the image to apply to the surface further comprise instructions operable to cause the one or more computing devices to transform the determined coordinates through at least a third coordinate space between the first coordinate space and the second coordinate space.

11. The system of claim 9, wherein the instructions operable to select an area of the image to apply to the surface further comprise instructions operable to cause the one or more computing devices to transform the determined coordinates through at least each of a third and fourth coordinate space between the first coordinate space and the second coordinate space.

12. The system of claim 9, wherein the instructions operable to select an area of the image to apply to the surface further comprise instructions operable to cause the one or more computing devices to transform the determined coordinates through at least each of a third, a fourth, and a fifth coordinate space between the first coordinate space and the second coordinate space.

13. A tangible, non-transitory computer-readable medium storing instructions, the instructions when executed by one or more computing devices, operable to cause the one or more computing devices to:
receive a user request to view a 3D model having at least one geolocated point from a particular viewing position, the particular viewing position being associated with a first coordinate space;
compare a 3D location of a surface of the 3D model to one or more locations of a plurality of geolocated images to select one geolocated image of the plurality of geolocated images to use to apply an image texture to the surface, wherein the instructions operable to cause the one or more computing devices to compare a 3D location of the surface of the 3D model to one or more locations of a plurality of geolocated images to select one geolocated image of the plurality of geolocated images to use to apply an image texture to the surface further comprise instructions operable to cause the one or more computing devices to:
determine a likely viewing point associated with the particular viewing position associated with the user request, the likely viewing point comprising a set of coordinates specifying an estimate of the particular viewing position, the likely viewing point being determined by determining a first point at a fixed distance along the normal of the surface from a point on the surface the set of coordinates being associated with a second coordinate space;
determine one or more geolocated images of the plurality of geolocated images captured from a position proximate the likely viewing point; and
determine which of the one or more geolocated images of the plurality of geolocated images was captured from an angle closest to an angle between the likely viewing point and the surface;
select an image of the plurality of geolocated images based at least in part on the comparison;
select an area of the selected image to apply to the surface;
apply the selected area of the selected image to the surface; and
provide for display the surface applied with the selected area of the selected image.

14. The computer-readable medium of claim 13, wherein the instructions operable to cause the one or more computing devices to select an image of the plurality of geolocated images based at least in part on the comparison further comprise instructions operable to cause the one or more computing devices to:
select from the database an image captured from a location near the likely viewing point.

15. The computer-readable medium of claim 13, wherein the instructions operable to select an area of the selected image to apply to the surface further comprise instructions operable to cause the one or more computing devices to:
determine coordinates of two or more vertices of the surface, the coordinates in the first coordinate space;
transform the determined coordinates for each of the two or more vertices from the first coordinate space to at least a second coordinate space, the determined coordinates in the second coordinate space corresponding to the respective positions in the selected image of the two or more vertices.

16. The computer-readable medium of claim 15, wherein the instructions operable to select an area of the image to apply to the surface further comprise instructions operable to cause the one or more computing devices to transform the determined coordinates through at least a third coordinate space between the first coordinate space and the second coordinate space.

17. The computer-readable medium of claim 15, wherein the instructions operable to select an area of the image to apply to the surface further comprise instructions operable to cause the one or more computing devices to transform the determined coordinates through at least each of a third and fourth coordinate space between the first coordinate space and the second coordinate space.

18. The computer-readable medium of claim 15, wherein the instructions operable to select an area of the image to apply to the surface further comprise instructions operable to cause the one or more computing devices to transform the determined coordinates through at least each of a third, a fourth, and a fifth coordinate space between the first coordinate space and the second coordinate space.

19. The computer-readable medium of claim 13, wherein the instructions operable to cause the one or more computing devices to compare a 3D location of the surface of the 3D model to one or more locations of a plurality of geolocated images to select one geolocated image of the plurality of geolocated images to use to apply an image texture to the surface further comprise instructions operable to cause the one or more computing devices to:
send to a server a request to perform a search within a database; and
receive from the server a result of the search.

* * * * *